(12) United States Patent
Vitthaladevuni et al.

(10) Patent No.: US 10,278,088 B2
(45) Date of Patent: Apr. 30, 2019

(54) CHANNEL ESTIMATION ENHANCEMENT

(71) Applicant: QUALCOMM Incorporated, San Diego, CA (US)

(72) Inventors: Pavan Kumar Vitthaladevuni, San Diego, CA (US); June Namgoong, San Diego, CA (US); Joseph Binamira Soriaga, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 15/389,337

(22) Filed: Dec. 22, 2016

(65) Prior Publication Data
US 2018/0027437 A1 Jan. 25, 2018

Related U.S. Application Data

(60) Provisional application No. 62/365,906, filed on Jul. 22, 2016.

(51) Int. Cl.
*H04W 4/00* (2018.01)
*H04W 24/10* (2009.01)
(Continued)

(52) U.S. Cl.
CPC ........... *H04W 24/10* (2013.01); *H04L 1/0026* (2013.01); *H04L 5/006* (2013.01); *H04L 5/0048* (2013.01);
(Continued)

(58) Field of Classification Search
CPC ..... H04L 1/0026; H04L 5/0048; H04L 5/006; H04W 24/10; H04W 52/10;
(Continued)

(56) References Cited

U.S. PATENT DOCUMENTS 9,042,932 B2 * 5/2015 Gao ...................... H04W 52/40
455/522
9,179,419 B2 * 11/2015 Park .................... H04W 52/242
(Continued)

FOREIGN PATENT DOCUMENTS

WO WO-2015137856 A1 9/2015

OTHER PUBLICATIONS

International Search Report and Written Opinion—PCT/US2017/043392—ISA/EPO—dated Nov. 22, 2017.
(Continued)

*Primary Examiner* — Frank Duong
(74) *Attorney, Agent, or Firm* — Loza & Loza, LLP

(57) ABSTRACT

Aspects of the present disclosure provide for enhanced channel estimation in a wireless communication network. Uplink channel estimation may be enhanced by increasing the uplink transmit power of an uplink reference signal. For example, the uplink transmit power may be increased by multiplying a measured downlink path loss by a predetermined factor to produce an increased downlink path loss and calculating the uplink transmit power based on the increased downlink path loss. Downlink channel estimation may be enhanced by increasing a number of tones on a downlink reference signal assigned to a scheduled entity relative to the number of tones assigned to other scheduled entities.

28 Claims, 13 Drawing Sheets

(51) Int. Cl.
*H04L 1/00* (2006.01)
*H04L 5/00* (2006.01)
*H04W 72/04* (2009.01)
*H04W 72/08* (2009.01)
*H04L 25/02* (2006.01)
*H04W 52/14* (2009.01)
*H04W 52/32* (2009.01)
*H04W 52/24* (2009.01)
*H04W 52/10* (2009.01)
*H04W 52/34* (2009.01)
*H04W 52/38* (2009.01)
*H04B 17/309* (2015.01)
*H04B 17/318* (2015.01)

(52) U.S. Cl.
CPC ....... *H04L 25/0224* (2013.01); *H04W 52/146* (2013.01); *H04W 52/242* (2013.01); *H04W 52/325* (2013.01); *H04W 72/0406* (2013.01); *H04W 72/0446* (2013.01); *H04W 72/085* (2013.01); *H04B 17/309* (2015.01); *H04B 17/318* (2015.01); *H04W 52/10* (2013.01); *H04W 52/343* (2013.01); *H04W 52/383* (2013.01)

(58) Field of Classification Search
CPC . H04W 52/143; H04W 52/242; H04W 72/04; H04W 72/0406; H04W 72/0446; H04W 72/08; H04W 72/085
See application file for complete search history.

(56) References Cited

U.S. PATENT DOCUMENTS

| | | | |
|---|---|---|---|
| 9,226,247 B2* | 12/2015 | Kim | H04W 52/242 |
| 2012/0263247 A1* | 10/2012 | Bhattad | H04L 25/0202 375/260 |
| 2014/0113677 A1* | 4/2014 | Parkvall | H04W 52/146 455/522 |
| 2015/0358920 A1 | 12/2015 | Sorrentino et al. | |

OTHER PUBLICATIONS

Partial International Search Report—PCT/US2017/043392—ISA/EPO—dated Sep. 29, 2017.

* cited by examiner

CHANNEL ESTIMATION ENHANCEMENT

PRIORITY CLAIM

This application claims priority to and the benefit of Provisional Patent Application No. 62/365,906 filed in the United States Patent Office on Jul. 22, 2016, the entire content of which is incorporated herein by reference as if fully set forth below in its entirety and for all applicable purposes.

TECHNICAL FIELD

The technology discussed below relates generally to wireless communication systems, and more particularly, to channel estimation in wireless communication systems.

INTRODUCTION

Wireless transmissions between a base station and one or more user equipment (UE) within a cell are generally dynamically scheduled in each subframe. For example, the base station may assign resources (e.g., time-frequency resources) for downlink transmissions to one or more UEs and grant the use of resources for uplink transmissions from one or more UEs. The downlink assignments and uplink grants may be provided to the UEs via a physical downlink control channel (PDCCH).

Scheduling of resources is generally performed with knowledge of the uplink and downlink channel conditions. Since exact channel information is not typically available within a cell, the channel conditions may be estimated by the base station or by the UE. For example, the UE may measure the Signal to Interference plus Noise Ratio (SINR) of a downlink signal and estimate the downlink channel conditions from the measured SINR. Similarly, the base station may measure the SINR of an uplink signal and estimate the uplink channel conditions from the measured SINR. However, the SINR of a downlink signal may be a function of a number of different variables, including the estimated uplink channel conditions and the resulting beam chosen for the downlink, along with the received downlink signal itself from which the SINR is measured. Errors in any of these variables may adversely affect the downlink channel estimation.

If downlink interference levels are low (e.g., the cell is sparsely loaded), the errors in the measured downlink SINR may not have any effect on the downlink perceived throughput. However, if the traffic in the cell is bursty, the interference experienced by UEs at the cell edges may impair the uplink and/or downlink channel estimations.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In an aspect of the disclosure, a method and apparatus configured for enhancing channel estimation in a wireless communication network are provided. Uplink channel estimation may be enhanced by increasing the uplink transmit power of an uplink reference signal. For example, the uplink transmit power may be increased by multiplying a measured downlink path loss by a predetermined factor to produce an increased downlink path loss and calculating the uplink transmit power based on the increased downlink path loss. Downlink channel estimation may be enhanced by increasing a number of tones on a downlink reference signal assigned to a scheduled entity relative to the number of tones assigned to other scheduled entities.

According to one example, a method of channel estimation in a wireless communication network may include measuring a downlink path loss to produce a measured downlink path loss. The measured downlink path loss may be multiplied by a predetermined factor to produce an increased downlink path loss having a value greater than the measured downlink path loss when the measured downlink path loss is greater than a threshold. An uplink transmit power may be calculated using the increased downlink path loss. An uplink reference signal may be transmitted with the uplink transmit power to enable an uplink channel estimation.

According to one aspect, an apparatus including a processor, a transceiver communicatively coupled to the processor, and a memory communicatively coupled to the processor may be provided. The processor may be configured to measure a downlink path loss to produce a measured downlink path loss. The processor may be further configured to multiply the measured downlink path loss by a predetermined factor to produce an increased downlink path loss having a value greater than the measured downlink path loss when the measured downlink path loss is greater than a threshold. The processor may still further be configured to calculate an uplink transmit power using the increased downlink path loss, and transmit an uplink reference signal with the uplink transmit power to enable an uplink channel estimation.

According to another example, a method for channel estimation in a wireless communication network may include measuring an uplink path loss for a scheduled entity of a set of scheduled entities. A downlink reference signal including a plurality of tones may be generated. Each of the plurality of tones may be assigned to a respective scheduled entity of the set of scheduled entities, wherein a number of the plurality of tones assigned to the scheduled entity of the set of scheduled entities is different than the number of the plurality of tones assigned to at least one other scheduled entity of the set of scheduled entities based on the uplink path loss. The downlink reference signal including the plurality of tones may be transmitted to the set of scheduled entities to enable downlink channel estimations at each of the scheduled entities of the set of scheduled entities.

According to another aspect, an apparatus including a processor, a transceiver communicatively coupled to the processor, and a memory communicatively coupled to the processor may be provided. The processor may be configured to measure an uplink path loss for a scheduled entity of a set of scheduled entities. The processor may be further configured to generate a downlink reference signal including a plurality of tones. The processor could be still further configured to assign each of the plurality of tones to a respective scheduled entity of the set of scheduled entities, wherein a number of the plurality of tones assigned to the scheduled entity of the set of scheduled entities is different than the number of the plurality of tones assigned to at least one other scheduled entity of the set of scheduled entities based on the uplink path loss. Still further the processor could be configured to transmit the downlink reference signal including the plurality of tones to the set of scheduled entities to enable downlink channel estimations at each of the scheduled entities of the set of scheduled entities.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

It is noted that real world traffic is bursty in nature. Despite the presence of a large number of UEs per cell, only some of the UEs in the cell may have data. Therefore, resource utilization in a given cell could be low. In such cells, packets for UEs in neighboring cells may not interfere with packets within the cell, which could result in a boost to downlink signal to interference plus noise (SINR) for all UEs. Cell Center UEs may experience high SINRs. For such UEs, errors in the uplink sounding reference signal (UL-SRS) and/or downlink reference signals, such as the demodulation reference signal (DMRS) and/or channel state information reference signal (CSI-RS) may not degrade (e.g., hurt) throughput. However, for the rest of the UEs (e.g., UEs at the cell edge), uplink estimation errors may degrade the channel estimate (at the base station) on the uplink, and thereby the beam used on the downlink and the downlink SINR. In addition, downlink estimation errors may degrade interference and channel measurements on the downlink, which can degrade the downlink SINR.

Therefore, for cell-edge UEs in sparsely loaded cells, an uplink SRS target power level may be boosted to assist in uplink channel estimation. In examples herein, a fraction of the path loss (e.g., a measured path loss between a base station and a UE) may be used in an equation to compute a power setting for the SRS of the UE, in which the fraction may be greater than one to increase the power level to a higher SRS target power level. This may assist downlink transmissions processed by UEs at the cell-edge, for example, when the resource utilization in a cell is low. Additionally, for cell-edge UEs in sparsely loaded cells, additional DMRS/CSI-RS tones may be included on the downlink to assist in downlink channel estimation. Furthermore, the number of DMRS/CSI-RS tones per resource block may be different for different UEs. The distribution of DMRS/CSI-RS tones may be signaled on the physical downlink control channel (PDCCH), so that when a given UE is scheduled, the PDCCH may be able to carry the information explaining which tones in a given resource block are used for the given UE.

Radio Access Network

Figure 1:
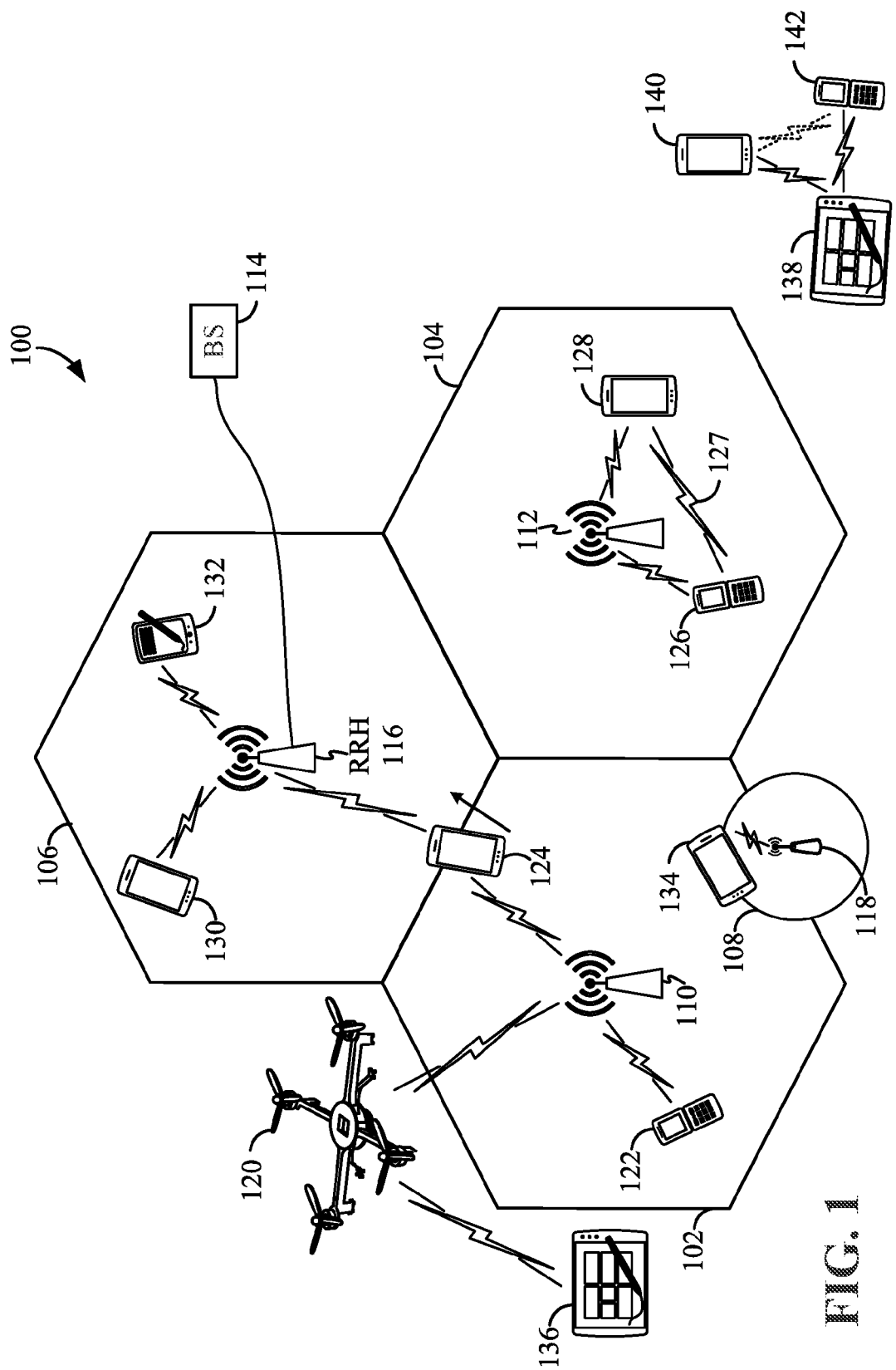
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. The access network 100 may be a next generation (e.g., fifth generation (5G)) access network or a legacy (3G or 4G) access network. In addition, one or more nodes in the access network 100 may be next generation nodes or legacy nodes.

As used herein, the term legacy access network refers to a network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network generally refers to a network employing continued evolved wireless communication technologies. This may include, for example, a fifth generation (5G) wireless communication technology based on a set of standards. The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum (www.vstgf) and Korea Telecom SIG (www.kt5g.org).

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a GNodeB or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or user data traffic from a base station (e.g., base station 110) to one or more UEs (e.g., UEs 122 and 124) may be referred to as downlink (DL) transmission, while transmissions of control information and/or user data traffic originating at a UE (e.g., UE 122) may be referred to as uplink (UL) transmissions. In addition, the uplink and/or downlink control information and/or user data traffic may be transmitted in slots, which may each include a certain number of symbols of variable duration. For example, the symbol duration may vary based on the cyclic prefix (e.g., normal or extended) and the numerology (e.g., subcarrier spacing) of the symbol. In some examples, a slot may include one or more mini-slots, which may refer to an encapsulated set of information capable of being independently decoded. One or more slots may be grouped together into a subframe. In addition, multiple subframes may be grouped together to form a single frame or radio frame. Any suitable number of subframes may occupy a frame. In addition, a subframe may have any suitable duration (e.g., 250 μs, 500 μs, 1 ms, etc.).

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources (e.g., of frequency and/or time) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity (i.e., UE 138).

Figure 2:
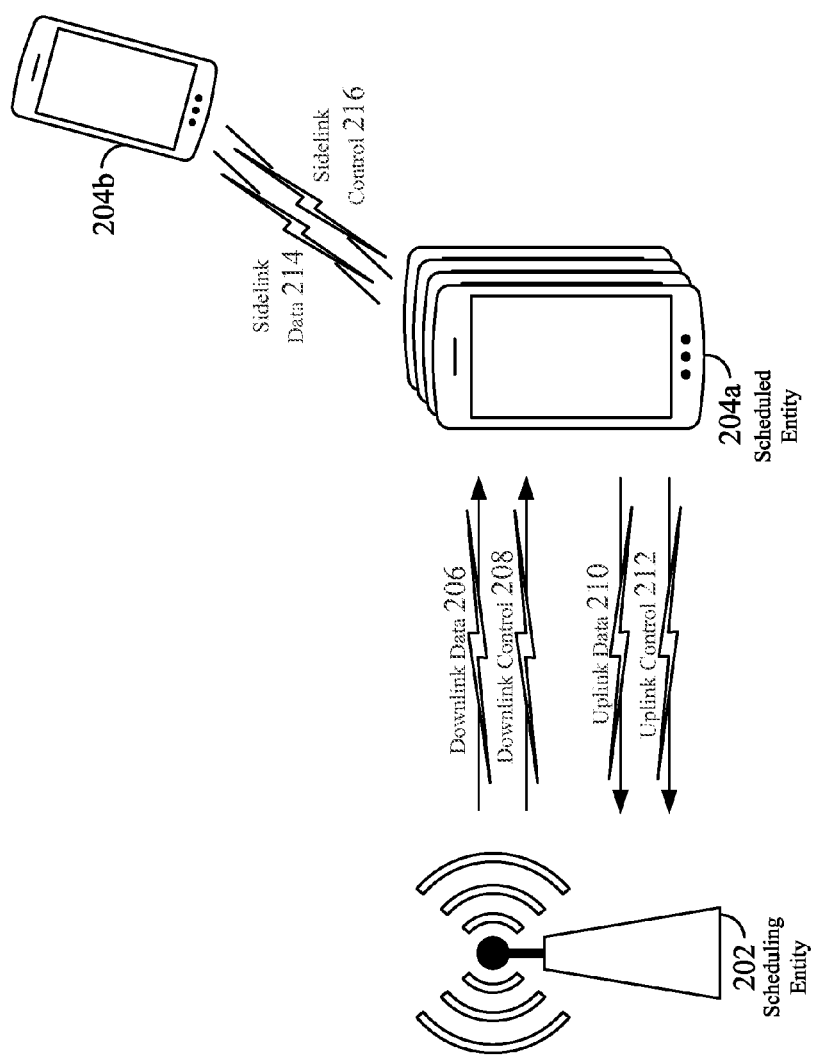
FIG. 2 is a block diagram conceptually illustrating an example of a scheduling entity communicating with one or more scheduled entities according to some aspects of the present disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of, a set of, scheduled entities 204 (e.g., 204a and 204b) according to some aspects of the present disclosure. Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast user data traffic 206 to one or more scheduled entities 204 (the user data traffic may be referred to as downlink user data traffic). In accordance with certain aspects of the present disclosure, the term downlink may refer to a point-to-multipoint transmission originating at the scheduling entity 202. Broadly, the scheduling entity 202 is a node or device responsible for scheduling user data traffic in a wireless communication network, including the downlink transmissions and, in some examples, uplink user data traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink user data traffic 210 and/or downlink user data traffic 206 including one or more traffic channels, such as a physical downlink shared channel (PDSCH) or a physical uplink shared channel (PUSCH) (and, in some examples, system information blocks (SIB s)), may additionally be transmitted between the scheduling entity 202 and the scheduled entity 204. Transmissions of the control and user data traffic information may be organized by subdividing a carrier, in time, into suitable slots.

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the slot for uplink packet transmissions.

Uplink and downlink transmissions may generally utilize a suitable error correcting block code. In a typical block code, an information message or sequence is split up into information blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, Walsh codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink data 214 and sidelink control 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS signals (e.g., handshake) may enable different scheduled entities performing sidelink communications to negotiate the availability of the sidelink channel prior to communication of the sidelink data information (traffic) 214. The PSHICH may include HARQ acknowledgment information and/or a HARQ indicator from a destination device, so that the destination may acknowledge data received from a source device.

The channels illustrated in FIG. 2 are not necessarily all of the channels that may be utilized between a scheduling entity 202 and scheduled entities 204, and those of ordinary skill in the art will recognize that other channels may be utilized in addition to those illustrated, such as other data, control, and feedback channels.

Resource Structure

Figure 3:
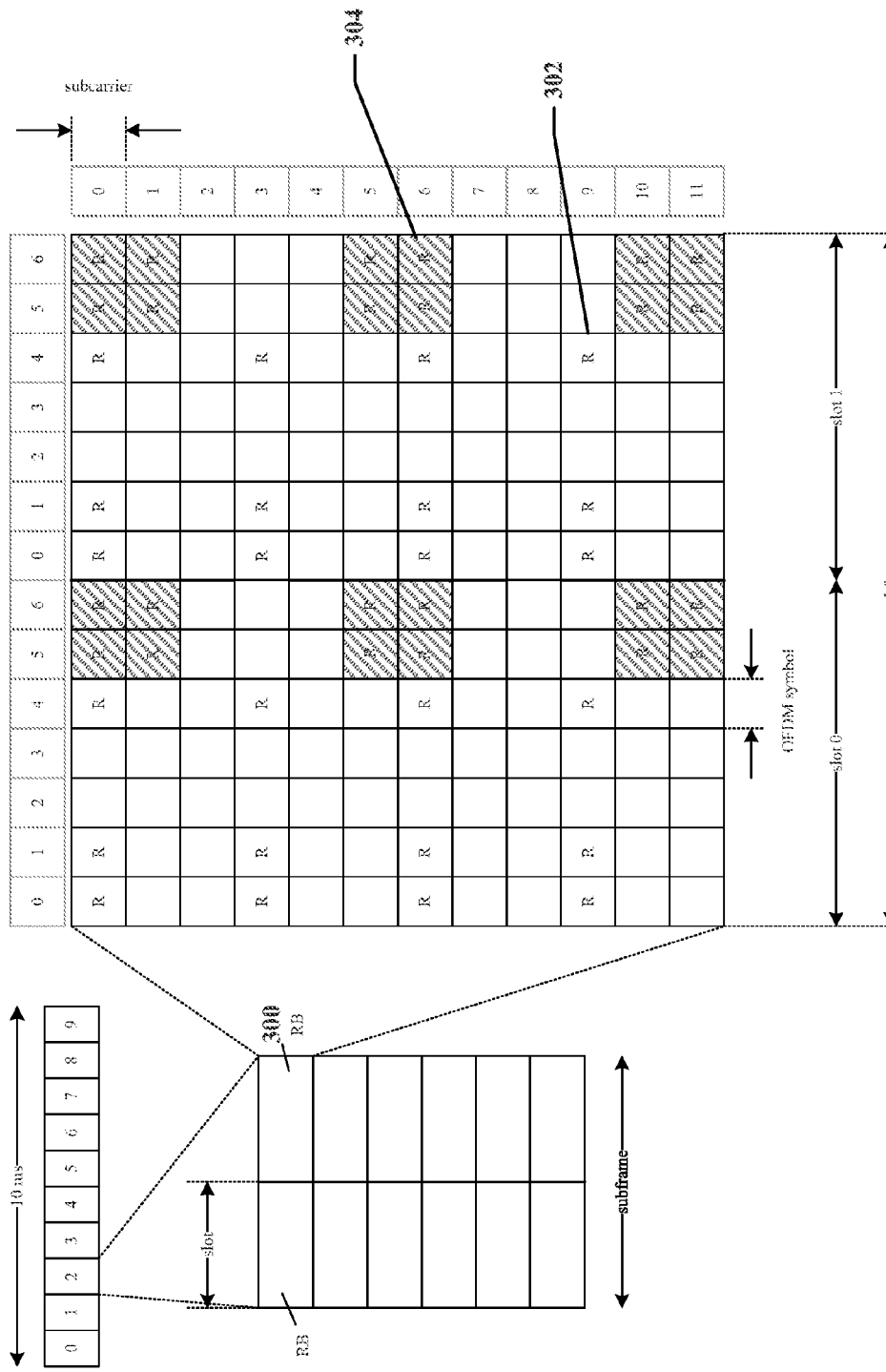
FIG. 3 is a diagram illustrating an example of a downlink frame structure for use in an access network according to some aspects of the present disclosure.

Various frame structures may be used to support the DL and UL transmissions between the scheduling entity 202 and scheduled entities 204. An example of a DL frame structure utilized in LTE will now be presented with reference to FIG. 3. However, as those skilled in the art will readily appreciate, the frame structure for any particular application may be different depending on any number of factors. In this example, a frame (10 ms) is divided into 10 equally sized subframes. Each subframe includes two consecutive time slots.

A resource grid may be used to represent two time slots, each time slot including a resource block 300 (RB). The resource block 300 is divided into multiple resource elements. In some examples, a resource block 300 contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS may include, for example, Cell-specific RS (CRS) for up to 4-layer spatial multiplexing in Multiple Input Multiple Output (MIMO) systems or Channel State Information RS (CSI-RS) for over 4-layer spatial multiplexing in MIMO systems and UE-specific RS (UE-RS) 304. UE-RS 304 are transmitted only on the resource blocks upon which the corresponding physical downlink shared channel (PDSCH) is mapped. In addition, the DL-RS may include a demodulation reference signal (DMRS). The number of bits carried by each resource element depends on the modulation scheme. Thus, the more resource blocks that a UE (e.g., scheduled entity) receives and the higher the modulation scheme, the higher the data rate for the scheduled entity.

A set of contiguous resource blocks may be referred to herein as a Resource Block Group (RBG) or sub-band. A set of sub-bands may span the entire downlink bandwidth. Scheduling of scheduled entities for downlink transmissions typically involves scheduling one or more resource elements within one or more sub-bands. The scheduling entity may schedule resource elements dynamically each subframe based on channel state information provided by the scheduled entity indicating the downlink channel conditions. The channel state information (CSI) may include, for example, the channel quality indicator (CQI), preceding matrix index (PMI) and rank indicator (RI).

For example, the scheduled entity may estimate the downlink channel by measuring the downlink channel quality (e.g., Signal to Interference plus Noise Ratio (SINR)) over the entire downlink bandwidth and provide a wideband channel quality indicator (CQI) to the scheduling entity or the scheduled entity may measure the channel quality over only the sub-bands for which the scheduled entity has scheduled data and provide respective CQI values for each scheduled sub-band to the scheduling entity. The CQI may include, for example, a modulation and coding scheme (MCS) index that indicates the highest modulation and code rate at which the block error rate (BLER) of the channel being analyzed does not exceed 10%. In some examples, the sub-band CQI values may be determined by combining the channel quality measurements (e.g., SINR) across layers (e.g., data streams in MIMO systems) and resource blocks to derive a total MCS index, which may then be normalized by the number of layers, with the resulting MCS index being fed back to the scheduling entity.

Figure 4:
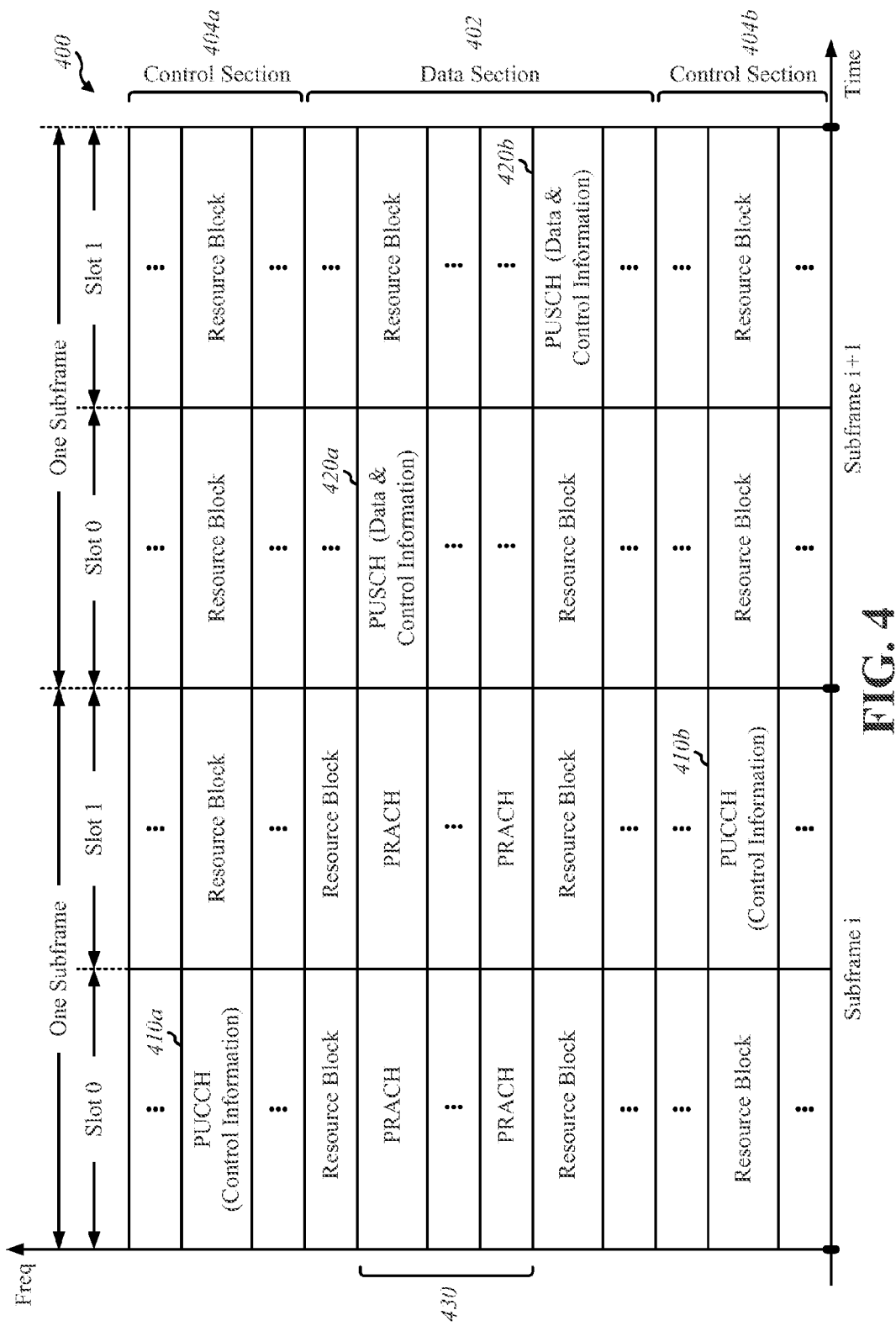
FIG. 4 is a diagram illustrating an example of an uplink frame structure for use in an access network according to some aspects of the present disclosure.

An example of a UL frame structure 400 utilized in LTE will now be presented with reference to FIG. 4. FIG. 4 shows an exemplary format for the UL. However, as those skilled in the art will readily appreciate, the frame structure for any particular application may be different depending on any number of factors.

The available resource blocks for the UL may be partitioned into a data section 402 and a control section 404*a*, 404*b*. The control section may be formed at the two edges of the system bandwidth and may have a configurable size. The resource blocks in the control section may be assigned to scheduled entities for transmission of control information. The data section may include all resource blocks not included in the control section. The design in FIG. 4 results in the data section including contiguous subcarriers, which may allow a single scheduled entity to be assigned all of the contiguous subcarriers in the data section.

A scheduled entity may be assigned resource blocks 410*a*, 410*b* in the control section to transmit control information to a scheduling entity. The scheduled entity may also be assigned resource blocks 420*a*, 420*b* in the data section to transmit data to the scheduling entity. The scheduled entity may transmit control information in a physical uplink control channel (PUCCH) on the assigned resource blocks in the control section. The scheduled entity may transmit only data or both data and control information in a physical uplink shared channel (PUSCH) on the assigned resource blocks in the data section. An UL transmission may span both slots of a subframe and may hop across frequency as shown in FIG. 4.

As shown in FIG. 4, a set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

In Time Division Duplex (TDD) systems, the uplink and downlink are reciprocal in that each uses different time slots of the same frequency bandwidth. Therefore, in TDD systems, the scheduling entity may estimate the downlink channel by estimating the uplink channel. In some examples, the scheduling entity may estimate the uplink channel based on uplink measurements of an uplink reference signal (e.g., based on a Sounding Reference Signal (SRS) or other pilot signal transmitted from the UE in the PUCCH, PUSCH or other channel). For example, the scheduling entity may estimate the Channel State Information (CSI), such as the Channel Quality Indictor (CQI), Rank Indicator (RI), and/or Precoding Matrix Indicator (PMI), and schedule downlink resources (e.g., time-frequency resource elements) to the UE based on the estimated downlink channel. The scheduling entity may further utilize the uplink channel estimate in scheduling uplink resources for the scheduled entity.

In various aspects of the disclosure, the uplink and downlink channel estimations may be enhanced by adjusting the uplink and downlink reference signals utilized in estimating the channel. In some examples, uplink channel estimation may be enhanced by increasing the uplink transmit power of the uplink reference signal (e.g., the SRS). For example, by increasing the uplink transmit power of the SRS, there may be fewer errors in the received SRS, thus enabling the eNB (e.g., scheduling entity) to perform a more accurate uplink channel estimate. In some examples, downlink channel estimation may be enhanced by increasing the number of tones (frequencies) on a downlink reference signal assigned to a UE (e.g., scheduled entity) relative to the number of tones assigned to other scheduled entities. For example, by increasing the number of downlink reference signal tones transmitted to a particular scheduled entity (e.g., a scheduled entity at a cell edge), there may be fewer errors in the received downlink reference signal, thus enabling the scheduled entity to perform a more accurate downlink channel estimate.

Scheduling Entity

Figure 5:
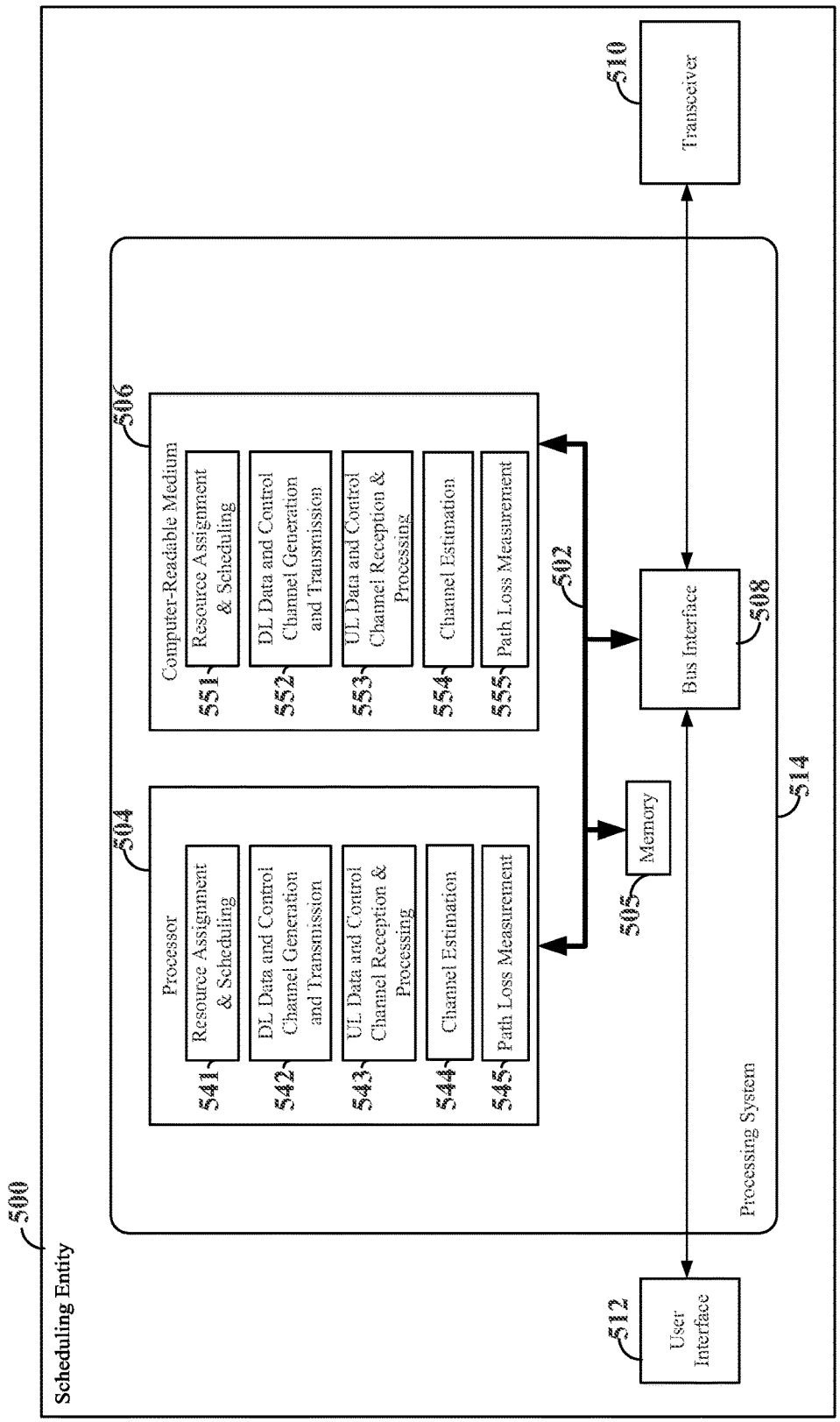
FIG. 5 is a block diagram illustrating an example of a hardware implementation for a scheduling entity employing a processing system according to some aspects of the present disclosure.

FIG. 5 is a block diagram illustrating an example of a hardware implementation for an exemplary scheduling entity 500 employing a processing system 514 according to some aspects of the present disclosure. For example, the scheduling entity 500 may be a user equipment (UE) as illustrated in any one or more of FIGS. 1 and 2. In another example, the scheduling entity 500 may be a base station as illustrated in any one or more of FIGS. 1 and 2. For example, the scheduling entity 500 may be a next generation (5G) scheduling entity.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes described below.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 604 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 504 may include circuitry configured for various functions. For example, the processor 504 may include resource assignment and scheduling circuitry 541, configured to generate, schedule, and modify a resource assignment or grant of time-frequency resources. For example, the resource assignment and scheduling circuitry 541 may schedule time-frequency resources (e.g., resource elements of resource blocks) within a plurality of sub-bands of one or more time division duplex (TDD) and/or frequency division duplex (FDD) subframes to carry data and/or control information to and/or from multiple scheduled entities.

The resource assignment and scheduling circuitry 541 may further receive channel state information (CSI) for respective channels between the scheduling entity 500 and each of the scheduled entities. In some examples, the channel state information may include a channel quality indicator (CQI), precoding matrix index (PMI), and/or rank indicator (RI). The CQI may include a wideband CQI value and/or multiple sub-band CQI values, each including modulation and coding scheme (MCS) information (e.g., an MCS index).

The resource assignment and scheduling circuitry 541 may select a modulation and coding scheme (MCS) and precoding matrix for downlink transmissions to the scheduled entities based on the CQI and PMI and assign a rank (e.g., number of data streams in a MIMO transmission) to the scheduled entity based on the RI (and other factors, such as the number of available resources). Using the MCS, precoding matrix and rank, the resource assignment and scheduling circuitry 541 may schedule time-frequency resources (e.g., resource elements of resource blocks) within one or more sub-bands of a subframe for one or more of the scheduled entities. In some examples, the resource assignment and scheduling circuitry 541 may further schedule a number of data streams (corresponding to the rank) to be spatially multiplexed to a scheduled entity in one or more sub-bands of a subframe.

The CSI may be received from the scheduled entities or may be estimated by the scheduling entity. In some examples, the resource assignment and scheduling circuitry 541 may schedule a downlink reference signal, such as a downlink demodulation reference signal (DMRS) or a CSI-Reference Signal (CSI-RS), to be included in a downlink data transmission to a scheduled entity. The DMRS may be utilized by the scheduled entity to estimate the downlink channel and calculate the CSI. The CSI-RS may include separate Cell-specific Reference Signal (C-RS) sequences for each layer (data stream) assigned to the scheduled entity to enable the scheduled entity to perform multi-layer channel estimation and return the calculated CSI based on the multi-layer channel estimation. The resource assignment and scheduling circuitry 541 may then adjust the MCS, precoding matrix and rank assigned to the scheduled entity based on the received CSI.

The resource assignment and scheduling circuitry 541 may further include a plurality of tones (frequencies) within the DMRS or CSI-RS and assign each of the tones to a particular scheduled entity. In various aspects of the disclosure, to enhance downlink channel estimation at the scheduled entities, the resource assignment and scheduling circuitry 541 may assign different numbers of DMRS/CSI-RS tones per resource block to different scheduled entities. For example, the resource assignment and scheduling circuitry 541 may assign a first number of DMRS/CSI-RS tones to a first scheduled entity and a second number of DMRS/CSI-RS tones to a second scheduled entity, where the first and second number of tones are different.

In some examples, the resource assignment and scheduling circuitry 541 may determine the number of tones assigned to each scheduled entity based on a respective uplink path loss measured by the scheduling entity on each uplink channel between the scheduling entity and the scheduled entities. In some examples, the total number of tones allocated to the DMRS/CSI-RS is set (predetermined). Therefore, the resource assignment and scheduling circuitry 541 may assign at least one tone to each scheduled entity and may further assign one or more additional tones, if available, to one or more of the scheduled entities based on the uplink path loss measurements. For example, if the uplink path loss on an uplink channel between the scheduling entity and a particular scheduled entity is high, the resource assignment and scheduling circuitry 541 may assign one or more additional tones of the DMRS/CSI-RS to that particular scheduled entity to enhance downlink channel estimation at that scheduled entity.

In some examples, the uplink path loss measurements may be compared to a threshold maintained, for example, in memory 505, to determine the number of tones assigned to each scheduled entity. For example, if the uplink path loss measurement value associated with a first scheduled entity is greater than the threshold, the resource assignment and scheduling circuitry 541 may assign one or more additional tones to the first scheduled entity relative to the number of tones assigned to other scheduled entities whose uplink path loss measurements are less than the threshold. Similarly, if the uplink path loss measurement value associated with a second scheduled entity is less than the threshold, the resource assignment and scheduling circuitry 541 may assign a fewer number of tones to the second scheduled entity relative to the number of tones assigned to other scheduled entities whose uplink path loss measurements are greater than the threshold. If all of the uplink path loss measurements are above the threshold (or below the threshold), the resource assignment and scheduling circuitry 541 may assign the same number of tones to each scheduled entity.

In an example, the number of tones assigned to the first scheduled entity may be greater than the number of tones assigned to the second scheduled entity when the uplink path loss for the first scheduled entity is greater than the threshold and the uplink path loss for the second scheduled entity is less than the threshold. In another example, the number of tones assigned to the first scheduled entity may be less than the number of tones assigned to the second scheduled entity when the uplink path loss for the first scheduled entity is less than the threshold and the uplink path loss for the second scheduled entity is greater than the threshold.

In some examples, the resource assignment and scheduling circuitry 541 may select the number of tones for each scheduled entity based on relative comparisons between the uplink path loss measurements. For example, scheduled entities that have higher path loss measurement values may be assigned more tones than scheduled entities with lower path loss measurement values. The number of tones assigned to each scheduled entity may vary sequentially from 1-N, with the lowest number of tones (e.g., 1) being assigned to the scheduled entity with the lowest path loss measurement value and the highest number of tones (e.g., N) being assigned to the scheduled entity with the highest path loss measurement value, depending on the number of available tones. The range of path loss measurement values may further be divided into measurement blocks, such that each scheduled entity having a path loss measurement value in the same measurement block is assigned the same number of tones. The division between measurement blocks and the number of tones associated with each measurement block may be determined based on the number of scheduled entities and the number of available tones.

The comparisons between path loss measurement values may be performed with or without a threshold. For example, when using a threshold, the scheduled entities with path loss measurement values above the threshold may be assigned additional tones relative to scheduled entities with path loss measurement values below the threshold. In addition, the number of additional tones may be determined based on a comparison of the path loss measurement values of the scheduled entities having path loss measurement values above the threshold and the total number of tones available. Similarly, the number of tones assigned to scheduled entities having path loss measurement values below the threshold may be determined based on a comparison of the path loss measurement values of the scheduled entities having path loss measurement values less than the threshold and the total number of tones available. The resource assignment and scheduling circuitry 541 may operate in coordination with resource assignment and scheduling software 551.

The processor 504 may further include downlink (DL) data and control channel generation and transmission circuitry 542, configured to generate and transmit downlink data and control channels within downlink subframes. The DL data and control channel generation and transmission circuitry 542 may operate in coordination with the resource assignment and scheduling circuitry 541 to place the DL data and/or control information onto a time division duplex (TDD) or frequency division duplex (FDD) carrier by including the DL data and/or control information within one or more sub-bands of subframes in accordance with the resources assigned to the DL data and/or control information. For example, the DL data and control channel generation and transmission circuitry 542 may generate and transmit one or more data streams within one or more sub-bands of a subframe to a scheduled entity based on the downlink resources assigned to the scheduled entity in each sub-band of the subframe.

In some examples, the DL data and control channel generation and transmission circuitry 542 may further generate and transmit a downlink reference signal, such as a DMRS or CSI-RS, to the scheduled entity. For example, the DL data and control channel generation and transmission circuitry 542 may be configured to generate a downlink reference signal with a plurality of tones, each assigned to a particular scheduled entity. Based on the scheduling information provided by the resource assignment and scheduling circuitry 541, the DL data and control channel generation and transmission circuitry 542 may transmit additional downlink reference signal tones to one or more scheduled entities to enhance downlink channel estimation by those scheduled entities. The DL data and control channel generation and transmission circuitry 542 may further operate in coordination with DL data and control channel generation and transmission software 552.

The processor 504 may further include uplink (UL) data and control channel reception and processing circuitry 543, configured to receive and process uplink control channels and uplink data channels from one or more scheduled entities. For example, the UL data and control channel reception and processing circuitry 543 may be configured to receive the CSI (e.g., CQI/PMI/RI) from a scheduled entity and provide the CSI to the resource assignment and scheduling circuitry 541 to select/adjust an MCS, precoding matrix and/or rank and schedule a next downlink transmission (e.g., downlink frame or subframe) to the scheduled entity based on the selected/adjusted MCS, precoding matrix and rank.

The UL data and control channel reception and processing circuitry 543 may further be configured to receive a respective uplink reference signal (e.g., a Sounding Reference Signal (SRS) or other pilot signal) from each scheduled entity. In some examples, the scheduling entity may estimate the respective uplink channels based on the received Sounding Reference Signals (SRSs), and the resource assignment and scheduling circuitry 541 may then utilize the uplink channel estimations for uplink frequency selective scheduling. In various aspects of the disclosure, the scheduling entity may further measure the respective uplink path loss of each uplink channel using the SRSs and provide the uplink path loss measurements to the resource assignment and scheduling circuitry 541 to schedule one or more tones of a downlink reference signal (e.g., DMRS and/or CSI-RS) to each scheduled entity based on the uplink path loss measurements. In some examples, one or more of the received SRSs are transmitted at higher uplink transmit powers to enhance uplink channel estimation and path loss measurement.

The UL data and control channel reception and processing circuitry 543 may further be configured to receive scheduling requests from one or more scheduled entities, the scheduling requests being configured to request a grant of time-frequency resources for uplink user data transmissions. In other examples, the UL data and control channel reception and processing circuitry 543 may be configured to receive and process acknowledgement information (e.g., acknowledged/not acknowledged packets) from one or more scheduled entities.

In general, the UL data and control channel reception and processing circuitry 543 may operate in coordination with the resource assignment and scheduling circuitry 541 to schedule UL data transmissions, DL data transmissions and/or DL data retransmissions in accordance with the received UL control channel information. The UL data and control channel reception and processing circuitry 543 may further operate in coordination with UL data and control channel reception and processing software 553.

The processor 504 may further include channel estimation circuitry 544, configured to estimate one or more parameters of a respective uplink channel between the scheduling entity and each of one or more scheduled entities served by the scheduling entity. For example, the channel estimation circuitry 544 may be configured to receive a SRS transmitted by a scheduled entity from the UL data and control channel reception and processing circuitry 543 and estimate the uplink channel (e.g., measure the SINR) between the scheduling entity and that scheduled entity based on the SRS. The uplink channel estimate may then be provided to the resource assignment and scheduling circuitry 541 for use in scheduling uplink resources.

In TDD systems, the channel estimation circuitry 544 may further utilize the uplink channel estimate to estimate the expected channel state information (CSI) for the downlink channel. From the estimated CSI, the resource assignment and scheduling circuitry 541 may assign an MCS, precoding matrix and rank to the scheduled entity and schedule resources for downlink transmissions to the scheduled entity based on the assigned MCS, precoding matrix and rank. The resource assignment and scheduling circuitry 541 may then receive CSI (e.g., CQI/PMI/RI) from the scheduled entity (e.g., via the UL data and control channel reception and processing circuitry 543) and adjust the rank and resources assigned to the scheduled entity based on whether the received CSI matches the expected CSI. The channel estimation circuitry 544 may further operate in coordination with channel estimation software 554.

The processor 504 may further include path loss measurement circuitry 545, configured to measure the respective path loss on respective uplink channels between the scheduling entity and one or more scheduled entities. In some examples, the path loss measurement circuitry 545 may receive the SRS transmitted by a particular scheduled entity from the UL data and control channel reception and processing circuitry 543 and measure the path loss using the received SRS. For example, the path loss measurement circuitry 545 may measure a reference signal received power (RSRP) of the SRS and subtract the RSRP from a known uplink transmit power of the SRS to determine the uplink path loss. The known uplink transmit power may be, for example, provided by the scheduled entity (e.g., when a higher transmit power is utilized by the scheduled entity), or determined by the scheduling entity and provided to the scheduled entity. The path loss measurement circuitry 545 may operate in coordination with path loss measurement software 555.

Scheduled Entity

Figure 6:
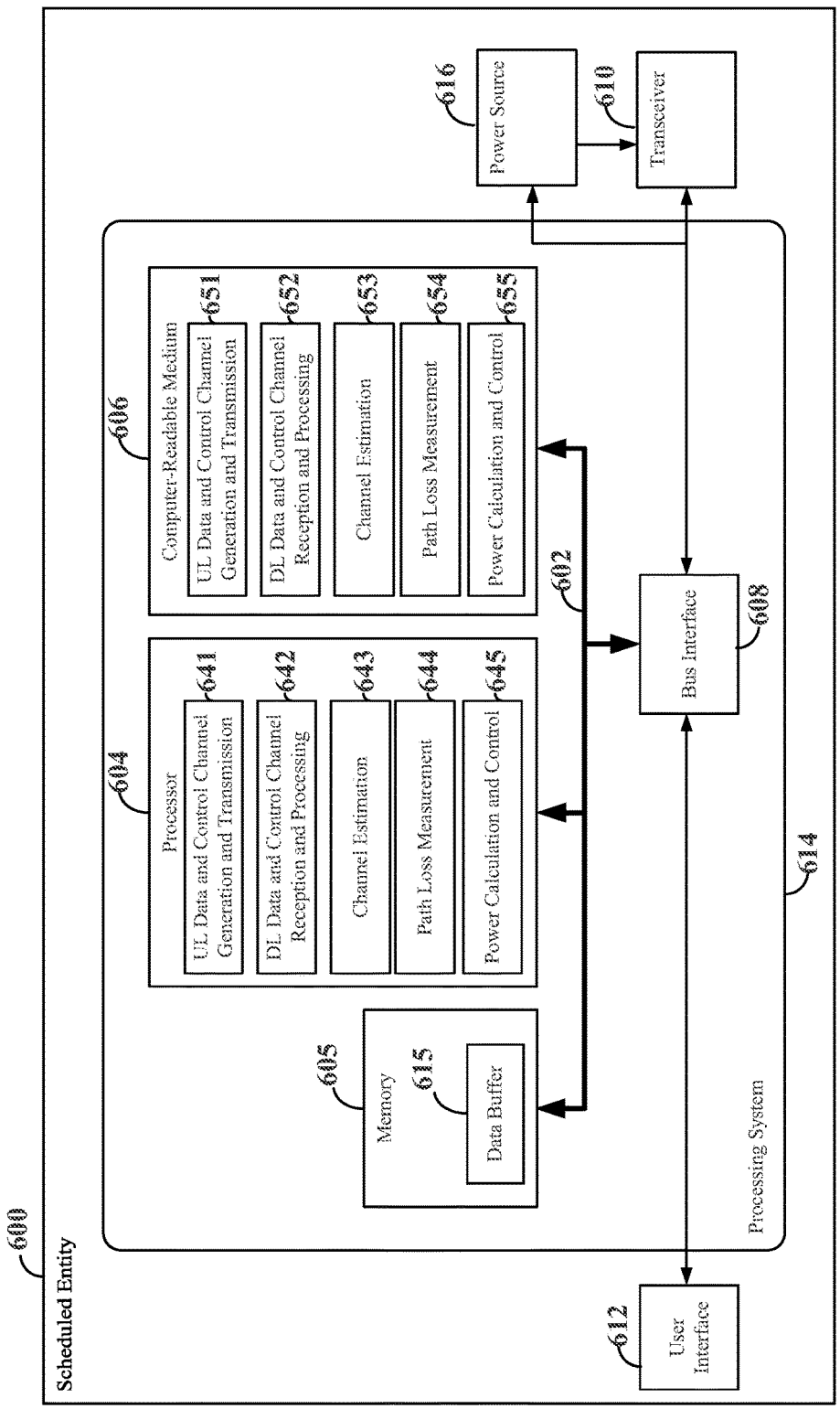
FIG. 6 is a block diagram illustrating an example of a hardware implementation for a scheduled entity employing a processing system according to some aspects of the present disclosure.

FIG. 6 is a block diagram illustrating an example of a hardware implementation for an exemplary scheduled entity 600 employing a processing system 614 according to some aspects of the present disclosure. In accordance with various aspects of the disclosure, an element, or any portion of an element, or any combination of elements may be implemented with a processing system 614 that includes one or more processors 604. For example, the scheduled entity 600 may be a user equipment (UE) as illustrated in any one or more of FIGS. 1 and 2.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described below.

In some aspects of the disclosure, the processor 604 may include uplink (UL) data and control channel generation and transmission circuitry 641, configured to generate and transmit uplink data on an UL data channel, and to generate and transmit uplink control/feedback/acknowledgement information on an UL control channel. For example, the UL data and control channel generation and transmission circuitry 641 may be configured to generate and transmit an uplink control channel (e.g., a Physical Uplink Control Channel (PUCCH)) including channel state information (CSI), such as channel quality information (CQI), preceding matrix index (PMI), and/or rank indicator (RI).

The UL data and control channel generation and transmission circuitry 641 may further be configured to generate and transmit an uplink reference signal, such as a Sounding Reference Signal (SRS) on, for example, the PUSCH, PUCCH or other channel. In various aspects of the disclosure, the UL data and control channel generation and transmission circuitry 641 may generate and transmit the uplink reference signal with an uplink transmit power selected to enhance uplink channel estimation at the scheduling entity. In some examples, the uplink transmit power may be determined based on downlink path loss measurements of the downlink channel between the scheduling entity and the scheduled entity. The UL data and control channel generation and transmission circuitry 641 may operate in coordination with UL data and control channel generation and transmission software 651.

The processor 604 may further include downlink (DL) data and control channel reception and processing circuitry 642, configured for receiving and processing downlink data on a data channel, and to receive and process control information on one or more downlink control channels. In some examples, received downlink data and/or control information may be temporarily stored in a data buffer 615 within memory 605.

For example, the DL data and control channel reception and processing circuitry 642 may be configured to receive a downlink reference signal (e.g., DMRS and/or CSI-RS) from the scheduling entity for use in measuring the channel conditions and calculating the CSI. In addition, the scheduling entity may measure the downlink path loss from the downlink reference signal and utilize the measured downlink path loss in calculating the uplink transmit power for an uplink reference signal. The DL data and control channel reception and processing circuitry 642 may operate in coordination with DL data and control channel reception and processing software 652.

The processor 604 may further include channel estimation circuitry 643, configured to receive the downlink reference signal (e.g., DMRS and/or CSI-RS) from the DL data and control channel reception and processing circuitry 642 and estimate the downlink channel from the downlink reference signal. In some examples, the channel estimation circuitry 643 may be configured to calculate the Channel State Information (CSI) based on the DMRS and/or CSI-RS. For example, the CSI-RS may include separate Cell-specific Reference Signal (C-RS) sequences for each layer (data stream) assigned to the scheduled entity. Therefore, from the CSI-RS, the channel estimation circuitry 643 may perform a multi-layer channel estimation and calculate the CSI (e.g., CQI, PMI, and/or RI) based on the multi-layer channel estimation.

The downlink reference signal may include one or more tones (frequencies) assigned to the scheduled entity 600. In some examples, the number of tones is selected to enhance downlink channel estimation by the channel estimation circuitry 643. For example, when uplink path loss is high, the downlink reference signal may include one or more additional tones for the scheduled entity 600 relative to other scheduled entities to enable the channel estimation circuitry 643 to more accurately estimate the downlink channel. The channel estimation circuitry 643 may operate in coordination with channel estimation software 653.

The processor 604 may further include path loss measurement circuitry 644, configured to measure the downlink path loss on a downlink channel between the scheduling entity and the scheduled entity. In some examples, the path loss measurement circuitry 644 may receive the downlink reference signal (e.g., DMRS or CSI-RS) transmitted by the scheduling entity from the DL data and control channel reception and processing circuitry 642 and measure the path loss using the received DMRS or CSI-RS. For example, the path loss measurement circuitry 644 may measure a reference signal received power (RSRP) of the downlink reference signal and subtract the RSRP from a known downlink transmit power of the downlink reference signal to determine the downlink path loss. The known downlink transmit power may be, for example, provided by the scheduling entity in another downlink control signal. The path loss measurement circuitry 644 may operate in coordination with path loss measurement software 654.

The processor 604 may further include power calculation and control circuitry 645, configured for calculating the uplink transmit power for an uplink reference signal (e.g., SRS) and controlling a power source 616 to transmit the uplink reference signal with the calculated uplink transmit power. In some examples, the power calculation and control circuitry 645 may calculate the uplink transmit power based on the measured downlink path loss provided by the path loss measurement circuitry 644.

For example, the power calculation and control circuitry 645 may compare the measured downlink path loss value to a threshold maintained, for example, in memory 605, and multiply the measured downlink path loss value by a predetermined factor to produce an increased downlink path loss when the measured downlink path loss is greater than the threshold. In some examples, the predetermined factor is a path loss compensation factor and the power calculation and control circuitry 645 may calculate the increased downlink path loss by setting the value of the path loss compensation factor greater than one and multiplying the measured downlink path loss by the path loss compensation factor to produce the increased downlink path loss. The power calculation and control circuitry 645 may then utilize the increased downlink path loss value to calculate the uplink transmit power.

For example, the SRS uplink transmit power $P_{SRS}$ transmitted on subframe i for serving cell c may be defined by:

$$P_{SRS,c}(i) = \min\{P_{CMAX,c}(i), P_{SRS\_OFFSET,c}(m) + 10 \log_{10}(M_{SRS,c}) + P_{O_{PUSCH},c}(j) + \alpha_c(j) * PL_c + f_c(i)\},$$

where $P_{CMAX,c}(i)$ is the configured scheduled entity transmit power in subframe i for serving cell c, $P_{SRS\_OFFSET,c}(m)$ is semi-statically configured by higher layers for m=0 (e.g., for SRS transmission trigger type 0) and m=1 (e.g., for SRS transmission trigger type 1) for the serving cell c, $M_{SRS,c}$ is the bandwidth of the SRS transmission in subframe i for serving cell c expressed in resource blocks, $f_c(i)$ is the current PUSCH power control adjustment state for serving cell c, $P_{O_{PUSCH},c}(j)$ is a parameter related to the scheduled entity transmit power for a PUSCH transmission where j=1 (j=0 is used for PUSCH (re)transmissions corresponding to a semi-persistent grant, j=1 is used for PUSCH (re)transmissions corresponding to a dynamic scheduled grant, and j=2 is used for PUSCH (re)transmissions corresponding to the random access response grant), $\alpha_c(j)$ is the path loss compensation factor where j=1. However, in the conventional art, $\alpha_c(j)$ when j=0, 1, 2, is limited to range between the values of 0 and 1. $PL_c$ is the downlink path loss measurement. By setting $\alpha_c(j)$ greater than 1, the measured downlink path loss ($PL_c$) may be increased (e.g., effectively increased by multiplication of $PL_c$ by a factor that is greater than 1), thereby enabling a higher uplink transmit power for the SRS. The above defined equation is one way of calculating SRS uplink transmit power, but the disclosure is not limited to this way of calculating SRS uplink transmit power.

In some examples, the path loss compensation factor may be set based on resource utilization information indicating an amount of resources in use (e.g., a percentage of resources in use or not in use) in the cell or network. Cell resource utilization information may be shared between scheduling entities over, for example, a backhaul network, and the scheduling entities may then utilize the cell resource utilization information to determine network resource utilization information. For example, the DL data and control channel reception and processing circuitry 642 may receive cell and/or network resource utilization information from the scheduling entity and provide the resource utilization information to the power calculation and control circuitry 645 for use in determining the path loss compensation factor. The resource utilization information may be used, for example, to determine a value greater than one at which to set the path loss compensation factor when the downlink path loss exceeds the downlink path loss threshold.

In some examples, the power calculation and control circuitry 645 may set the path loss compensation factor, $\alpha_c(j)$, to a higher value (e.g., a value greater than 1) to further increase the uplink transmit power, $P_{SRS}$, when the resource utilization information indicates that the cell or network is currently heavily loaded. For example, the power calculation and control circuitry 645 may further compare a value of resource utilization information to a utilization threshold amount and set the path loss compensation factor to a higher value when the resource utilization information value exceeds the utilization threshold amount. A sliding scale of path loss compensation factor values and corresponding resource utilization information values may also be used. The power calculation and control circuitry 645 may operate in coordination with power calculation and control software 655.

Physical Downlink Shared Channel

Figure 7:
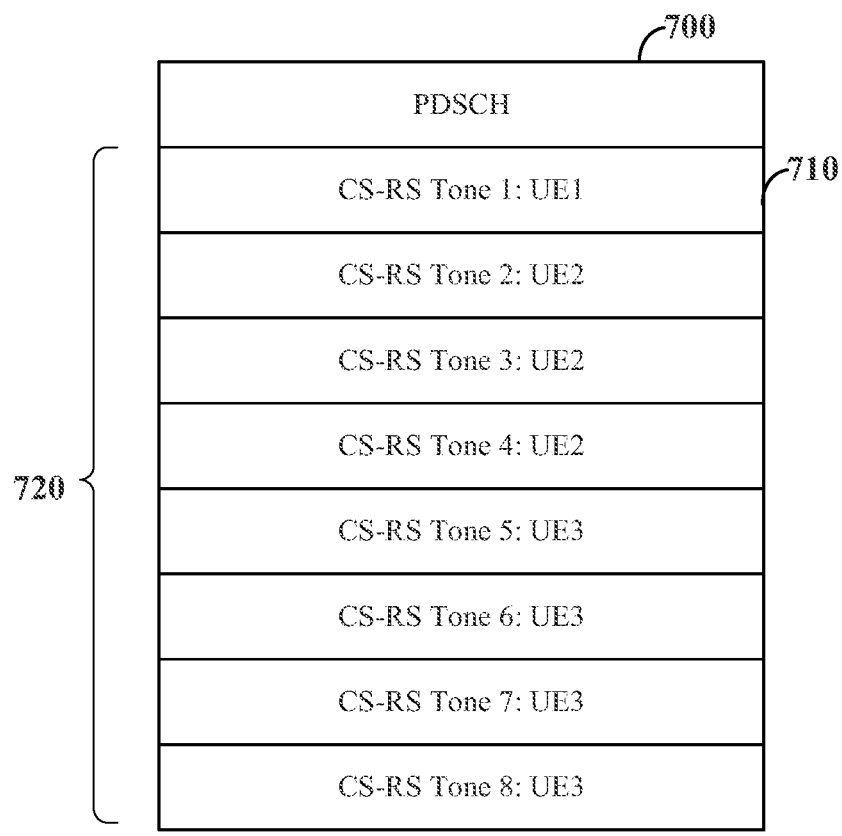
FIG. 7 is a diagram illustrating an example of a physical downlink shared channel including a plurality of tones allocated to a downlink reference signal that may be assigned to different scheduled entities according to some aspects of the present disclosure.

FIG. 7 is a diagram illustrating an example of a physical downlink shared channel (PDSCH) 700 including a plurality of tones 710 allocated to a downlink reference signal 720 (e.g., a CS-RS, such as the CSI-RS or DMRS) that may be assigned to different scheduled entities (UEs) according to some aspects of the present disclosure. In the example shown in FIG. 7, there are eight tones 710 (CS-RS Tone 1 ... CS-RS Tone 8) allocated to the downlink reference signal. The first tone (CS-RS Tone 1) is assigned to a first scheduled entity (UE1), the next three tones (CS-RS Tone 2-CS-RS Tone 4) are assigned to a second scheduled entity (UE2), and the last four tones (CS-RS Tone 5-CS-RS Tone 8) are assigned to a third scheduled entity (UE3). Thus, the number of tones 710 assigned to each scheduled entity are different within the downlink reference signal 720. The number of tones 710 may be determined based on, for example, the respective uplink path loss experienced by respective uplink reference signals transmitted by the scheduled entities, and may be selected to enhance downlink channel estimation at the scheduled entities.

Channel Estimation Processes

Figure 8:
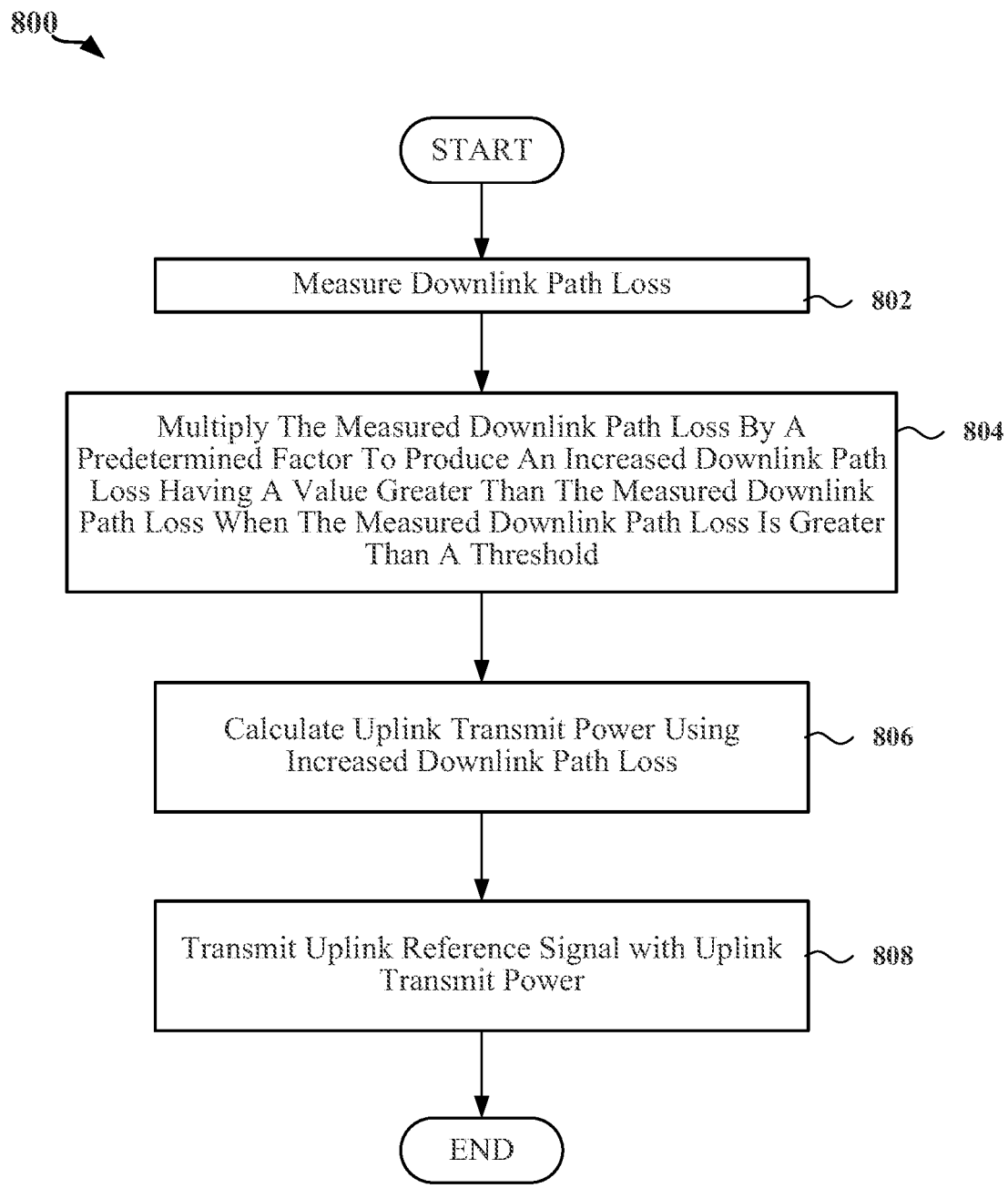
FIG. 8 is a flow chart illustrating an exemplary process for channel estimation in a wireless communication network according to some aspects of the present disclosure.

FIG. 8 is a flow chart illustrating an exemplary process 800 for channel estimation in a wireless communication network according to some aspects of the present disclosure. As described below, some or all illustrated features may be omitted in a particular implementation within the scope of the present disclosure, and some illustrated features may not be required for implementation of all embodiments. In some examples, the process 800 may be carried out by the scheduled entity 600 illustrated in FIG. 6. In some examples, the process 800 may be carried out by any suitable apparatus or means for carrying out the functions or algorithm described below.

At block 802, the scheduled entity may measure the downlink path loss based on a received downlink reference signal. In some examples, the scheduled entity may measure the downlink path loss to produce a measured downlink path loss. In some examples, the downlink reference signal may be the DMRS or CSI-RS. For example, the scheduled entity may measure a reference signal received power (RSRP) of the downlink reference signal and subtract the RSRP from a known downlink transmit power of the downlink reference signal to determine the downlink path loss. For example, the path loss measurement circuitry 644 shown and described above in reference to FIG. 6 may measure the downlink path loss.

At block 804, the scheduled entity may multiply the measured downlink path loss by a predetermined factor to produce an increased downlink path loss having a value greater than the measured downlink path loss when the measured downlink path loss is greater than a threshold. In this way, the scheduled entity may increase the measured downlink path loss by a predetermined factor when the measured path loss is greater than a threshold. In some examples, the predetermined factor is a path loss compensation factor and the measured downlink path loss value may be increased by setting the value of the path loss compensation factor to greater than one and multiplying the measured downlink path loss by the path loss compensation factor. For example, the power calculation and control circuitry 645 shown and described above in reference to FIG. 6 may increase the measured path loss.

At block 806, the scheduled entity may calculate the uplink transmit power for an uplink reference signal using the increased downlink path loss value. In some examples, the scheduled entity may calculate an uplink transmit power using the increased downlink path loss. For example, the power calculation and control circuitry 645 shown and described above in reference to FIG. 6 may calculate the uplink transmit power for the uplink reference signal.

At block 808, the scheduled entity may transmit the uplink reference signal with the calculated uplink transmit power to enhance uplink channel estimation at the scheduling entity. In some examples, the scheduled entity may transmit an uplink reference signal with the uplink transmit power to enable an uplink channel estimation. In some examples, the uplink reference signal is a Sounding Reference Signal (SRS). For example, the UL data and control channel generation and transmission circuitry 641 shown and described above in reference to FIG. 6 may transmit the uplink reference signal with the calculated uplink transmit power.

In some aspects of the process 800 for channel estimation in a wireless communication network, multiplying the measured downlink path loss by the predetermined factor to produce the increased downlink path loss may further include multiplying the measured downlink path loss by a path loss compensation factor having a value greater than one to produce the increased downlink path loss. In some aspects, the process 800 for channel estimation in a wireless communication network may further include setting a value of the path loss compensation factor based on resource utilization information indicating an amount of resources in use in the wireless communication network. In one example, calculating the uplink transmit power may include calculating the uplink transmit power for a Sounding Reference Signal (SRS). In one example, transmitting the uplink reference signal may include transmitting the SRS with the uplink transmit power for the SRS.

In some aspects, the process 800 for channel estimation in a wireless communication network includes measuring the downlink path loss to produce the measured downlink path loss, where the measured downlink path loss is measured based on a downlink reference signal. In some aspects, measuring the downlink path loss based on the downlink reference signal further comprises: receiving a channel state information reference signal, measuring a reference signal received power of the channel state information reference signal, and subtracting the reference signal received power from a known downlink transmit power to produce the measured downlink path loss. In some aspects, measuring the downlink path loss based on the downlink reference signal further comprises: receiving a downlink demodulation reference signal, measuring a reference signal received power of the demodulation reference signal, and subtracting the reference signal received power from a known downlink transmit power to produce the measured downlink path loss.

Figure 9:
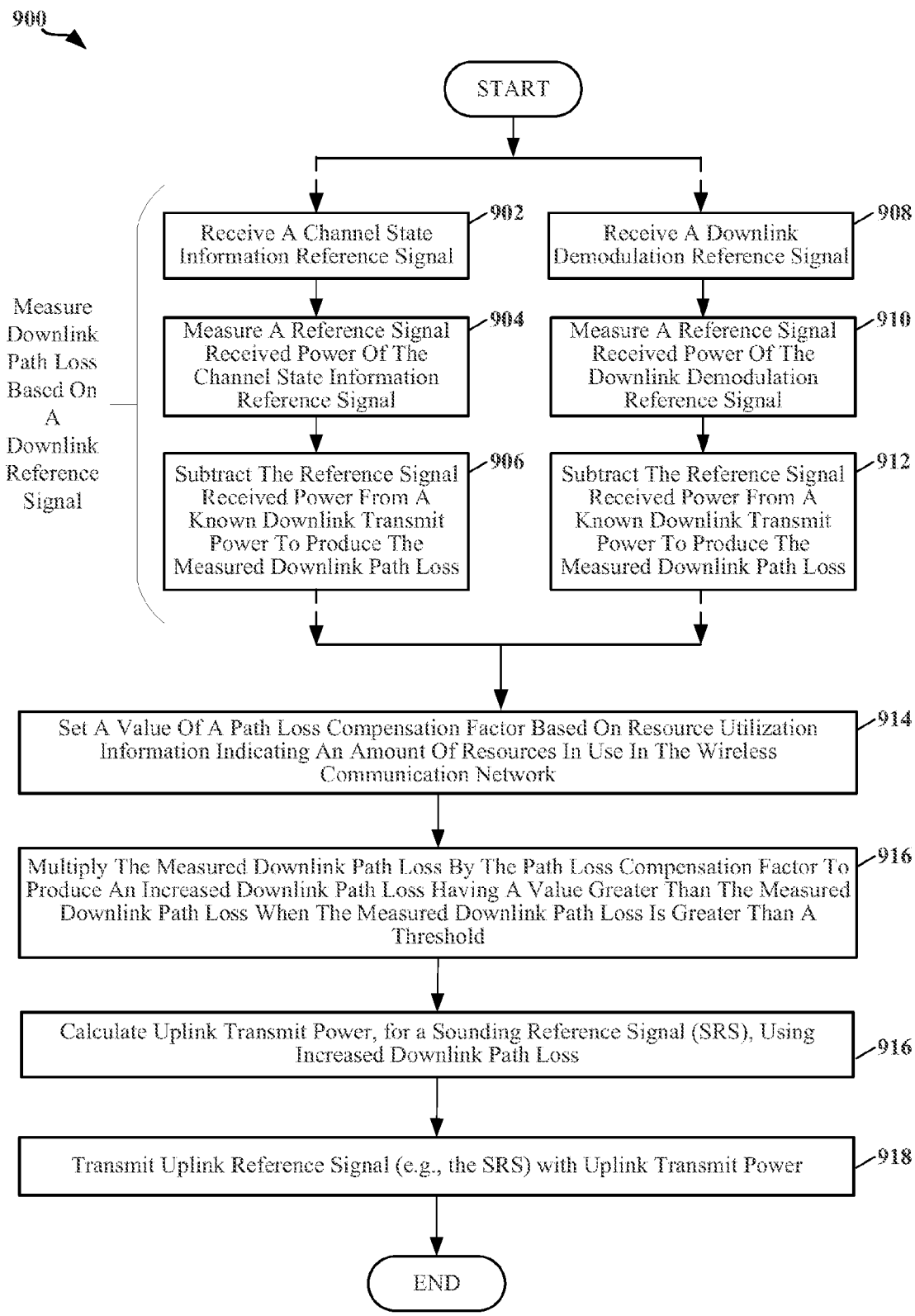
FIG. 9 is a flow chart illustrating an exemplary process for channel estimation in a wireless communication network according to some aspects of the present disclosure.

FIG. 9 is a flow chart illustrating an exemplary process 900 for channel estimation in a wireless communication network according to some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduled entity 600 illustrated in FIG. 6. In some examples, the process 900 may be carried out by any suitable apparatus or means for carrying out the functions or algorithm described below.

According to FIG. 9, a scheduled entity may measure the downlink path loss based on a received downlink reference signal. In one aspect, the downlink reference signal may be a channel state information reference signal, while in another aspect, the downlink reference signal may be a downlink demodulation reference signal. Other reference signals are within the scope of the disclosure. According to a first alternate path, at block 902, the scheduled entity may receive a channel state information reference signal. At block 904, the scheduled entity may measure a reference signal receive power of the channel stated information reference signal. At block 906, the scheduled entity may subtract the reference signal received power from a known downlink transmit power to produce the measured downlink path loss. According to a second alternative, at block 908, the scheduled entity may receive a downlink demodulation reference signal. At block 910, the scheduled entity may measure a reference signal receive power of the downlink demodulation reference signal. At block 912, the scheduled entity may subtract the reference signal received power from a known downlink transmit power to produce the measured downlink path loss. Other ways to measure the downlink path loss are acceptable. For example, the path loss measurement circuitry 644 shown and described above in reference to FIG. 6 may measure the downlink path loss.

At block 914, the scheduled entity may set a value of a path loss compensation factor based on resource utilization information indicating an amount of resources in use in the wireless communication network. For example, the downlink data and control channel reception and processing circuitry 642 shown and described above in reference to FIG. 6 may set a value of the path loss compensation factor.

At block 916, the scheduled entity may multiply the measured downlink path loss by a predetermined factor (e.g., the path loss compensation factor) to produce an increased downlink path loss having a value greater than the measured downlink path loss when the measured downlink path loss is greater than a threshold. In this way, the scheduled entity may increase the measured downlink path loss by a predetermined factor when the measured path loss is greater than a threshold. In some examples, the predetermined factor is a path loss compensation factor and the measured downlink path loss value may be increased by setting the value of the path loss compensation factor to greater than one and multiplying the measured downlink path loss by the path loss compensation factor. For example, the power calculation and control circuitry 645 shown and described above in reference to FIG. 6 may increase the measured path loss.

At block 918, the scheduled entity may calculate the uplink transmit power for an uplink reference signal using the increased downlink path loss value. In some examples, the scheduled entity may calculate an uplink transmit power, for a sounding reference signal (SRS), using the increased downlink path loss. For example, the power calculation and control circuitry 645 shown and described above in reference to FIG. 6 may calculate the uplink transmit power for the uplink reference signal.

At block 916, the scheduled entity may transmit the uplink reference signal (e.g., the SRS) with the calculated uplink transmit power to enhance uplink channel estimation at the scheduling entity. In some examples, the scheduled entity may transmit an uplink reference signal with the uplink transmit power to enable an uplink channel estimation. In some examples, the uplink reference signal is a Sounding Reference Signal (SRS). For example, the UL data and control channel generation and transmission circuitry 641 shown and described above in reference to FIG. 6 may transmit the uplink reference signal with the calculated uplink transmit power.

In some aspects, the downlink reference signal comprises a plurality of tones. Each of the plurality of tones may be assigned to a respective scheduled entity of a set of scheduled entities. Each scheduled entity of the set of scheduled entities may be assigned a respective number of the plurality of tones, and the number of tones assigned to at least one scheduled entity of the set of scheduled entities may be different than the number of tones assigned to other scheduled entities of the set of scheduled entities. The processes 800, 900 may further include estimating, by a select scheduled entity of the set of scheduled entities, one or more parameters of a downlink channel between a scheduling entity and the select scheduled entity using the number of tones in the downlink reference signal assigned to the select scheduled entity. In some aspects, the number of tones assigned to the select scheduled entity may be greater than the number of tones assigned to at least one other scheduled entity of the set of scheduled entities. Estimating the one or more parameters of the downlink channel may further include calculating channel state information for the downlink channel using the number of tones in the downlink reference signal assigned to the select scheduled entity, and transmitting the channel state information to the scheduling entity.

Figure 10:
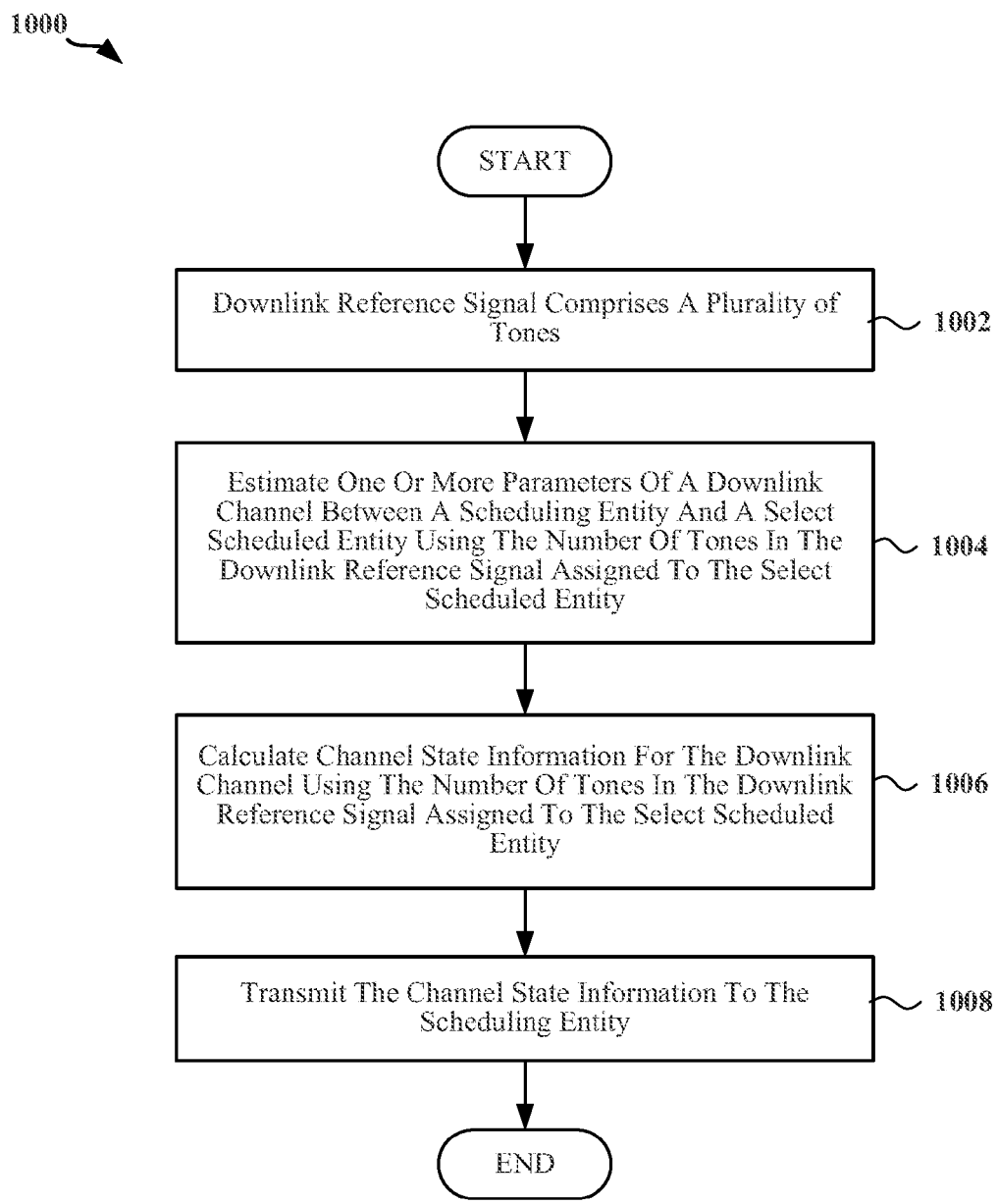
FIG. 10 is a flow chart illustrating an exemplary process for channel estimation in a wireless communication network according to some aspects of the present disclosure.

FIG. 10 is a flow chart illustrating an exemplary process 1000 for channel estimation in a wireless communication network according to some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduled entity 600 illustrated in FIG. 6. In some examples, the process 1000 may be carried out by any suitable apparatus or means for carrying out the functions or algorithm described below.

As illustrated in FIG. 10, in some aspects, for example at block 1002, the downlink reference signal comprises a plurality of tones. The downlink reference signal may be the downlink reference signal described in connection with FIGS. 8 and 9. Each of the plurality of tones may be assigned to a respective scheduled entity of a set of scheduled entities. Each scheduled entity of the set of scheduled entities may be assigned a respective number of the plurality of tones, and the number of tones assigned to at least one scheduled entity of the set of scheduled entities may be different than the number of tones assigned to other scheduled entities of the set of scheduled entities. At block 1004, a select scheduled entity of the set of scheduled entities may estimate one or more parameters of a downlink channel between a scheduling entity and the select scheduled entity using the number of tones in the downlink reference signal assigned to the select scheduled entity. For example, the channel estimation circuitry 643 shown and described above in reference to FIG. 6 may estimate one or more parameters of a downlink channel. In some aspects, the number of tones assigned to the select scheduled entity may be greater than the number of tones assigned to at least one other scheduled entity of the set of scheduled entities. At block 1006, the select scheduled entity may calculate channel state information for the downlink channel using the number of tones in the downlink reference signal assigned to the select scheduled entity. For example, the downlink data and control channel reception and processing circuitry 642 shown and described above in reference to FIG. 6 may calculate channel state information. At block 1008, the select scheduled entity may transmit the channel state information to the scheduling entity. For example, the transceiver 610 shown and described above in reference to FIG. 6 may transmit the channel state information.

Figure 11:
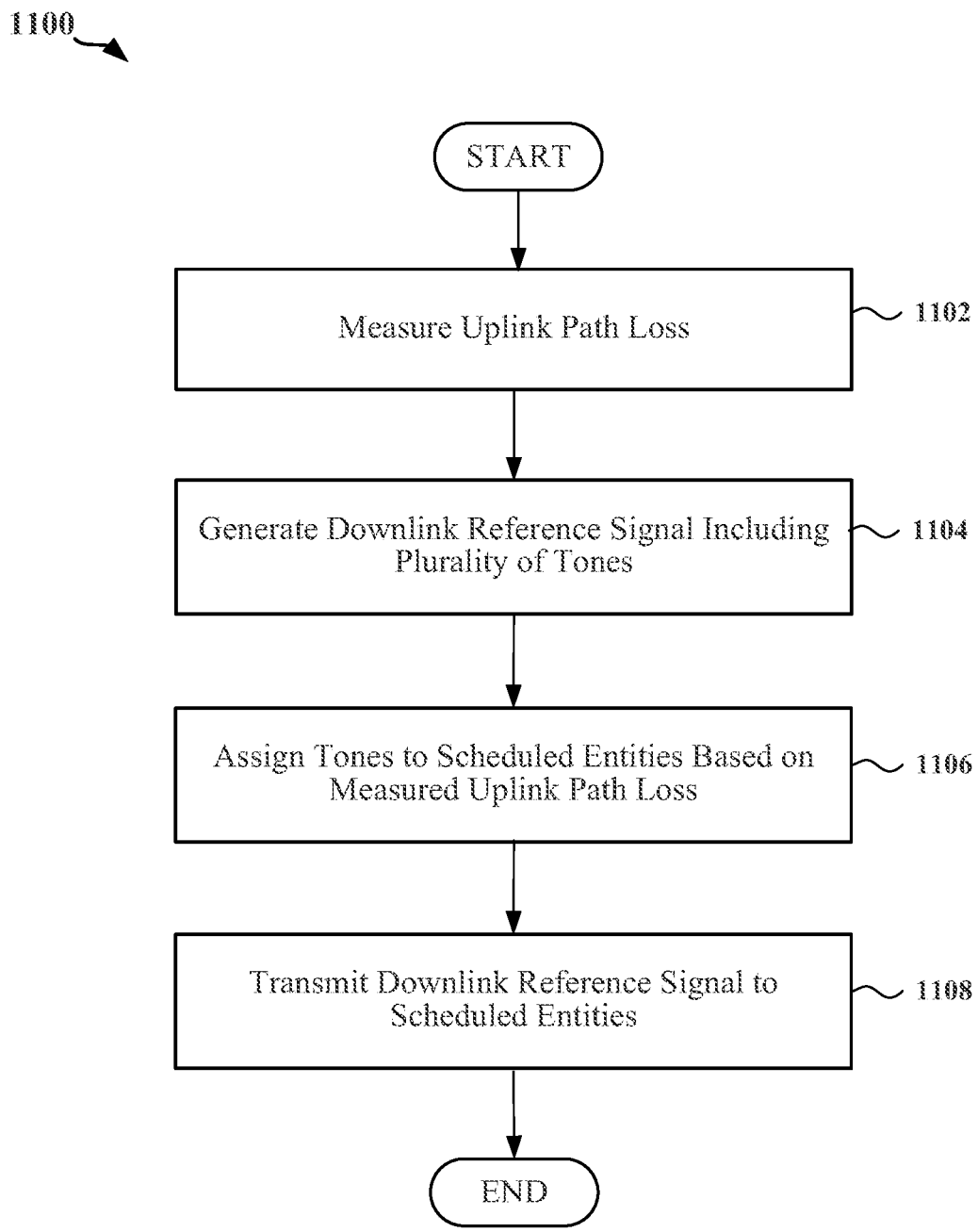
FIG. 11 is a flow chart illustrating another exemplary process for channel estimation in a wireless communication network according to some aspects of the present disclosure.

FIG. 11 is a flow chart illustrating another exemplary process 1100 for channel estimation in a wireless communication network according to some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 500 illustrated in FIG. 5. In some examples, the process 1100 may be carried out by any suitable apparatus or means for carrying out the functions or algorithm described below.

At block 1102, the scheduling entity may measure the respective uplink path loss on each uplink channel between the scheduling entity and scheduled entities based on a respective received uplink reference signal. In some examples, the scheduling entity may measure an uplink path loss for a scheduled entity of a set of scheduled entities. In some examples, the uplink reference signal may be the SRS. For example, the scheduling entity may measure a reference signal received power (RSRP) of an uplink reference signal and subtract the RSRP from a known uplink transmit power of the uplink reference signal to determine the uplink path loss. For example, the path loss measurement circuitry 545 shown and described above in reference to FIG. 5 may measure the uplink path loss.

At block 1104, the scheduling entity may generate a downlink reference signal including a plurality of tones. For example, the DL data and control channel generation and transmission circuitry 542 shown and described above in reference to FIG. 5 may generate the downlink reference signal.

At block 1106, the scheduling entity may assign tones to scheduled entities based on the measured uplink path loss values. In some examples, the scheduling entity may assign each of the plurality of tones to a respective scheduled entity of the set of scheduled entities, wherein a number of the plurality of tones assigned to the scheduled entity of the set of scheduled entities is different than the number of the plurality of tones assigned to at least one other scheduled entity of the set of scheduled entities based on the uplink path loss. In some examples, different numbers of tones are assigned to different scheduled entities to enhance downlink channel estimation at the scheduled entities. In some examples, the scheduling entity may signal an assignment of the plurality of tones to the scheduled entity. For example, the resource assignment and scheduling circuitry 541 shown and described above in reference to FIG. 5 may assign tones to scheduled entities and signal the assignment of tones to scheduled entities.

At block 1108, the scheduling entity may transmit the downlink reference signal with the assigned tones to the scheduled entities. In some examples, the scheduling entity may transmit the downlink reference signal including the plurality of tones to the set of scheduled entities to enable downlink channel estimations at each of the scheduled entities of the set of scheduled entities. In some examples, the downlink reference signal is a DMRS or CSI-RS. For example, the DL data and control channel generation and transmission circuitry 542 shown and described above in reference to FIG. 5 may transmit the downlink reference signal to the scheduled entities.

In some aspects of the process 1100 for channel estimation in a wireless communication network, the number of the plurality of tones assigned to the scheduled entity of the set of scheduled entities is greater than the number of the plurality of tones assigned to the at least one other scheduled entity of the set of scheduled entities when the uplink path loss for the scheduled entity is greater than a threshold and the uplink path loss for the at least one other scheduled entity is less than the threshold. In other aspects of the process 1100 for channel estimation in a wireless communication network, the number of the plurality of tones assigned to the scheduled entity of the set of scheduled entities is less than the number of the plurality of tones assigned to the at least one other scheduled entity of the set of scheduled entities when the uplink path loss for the scheduled entity is less than a threshold and the uplink path loss for the at least one other scheduled entity is greater than the threshold.

Figure 12:
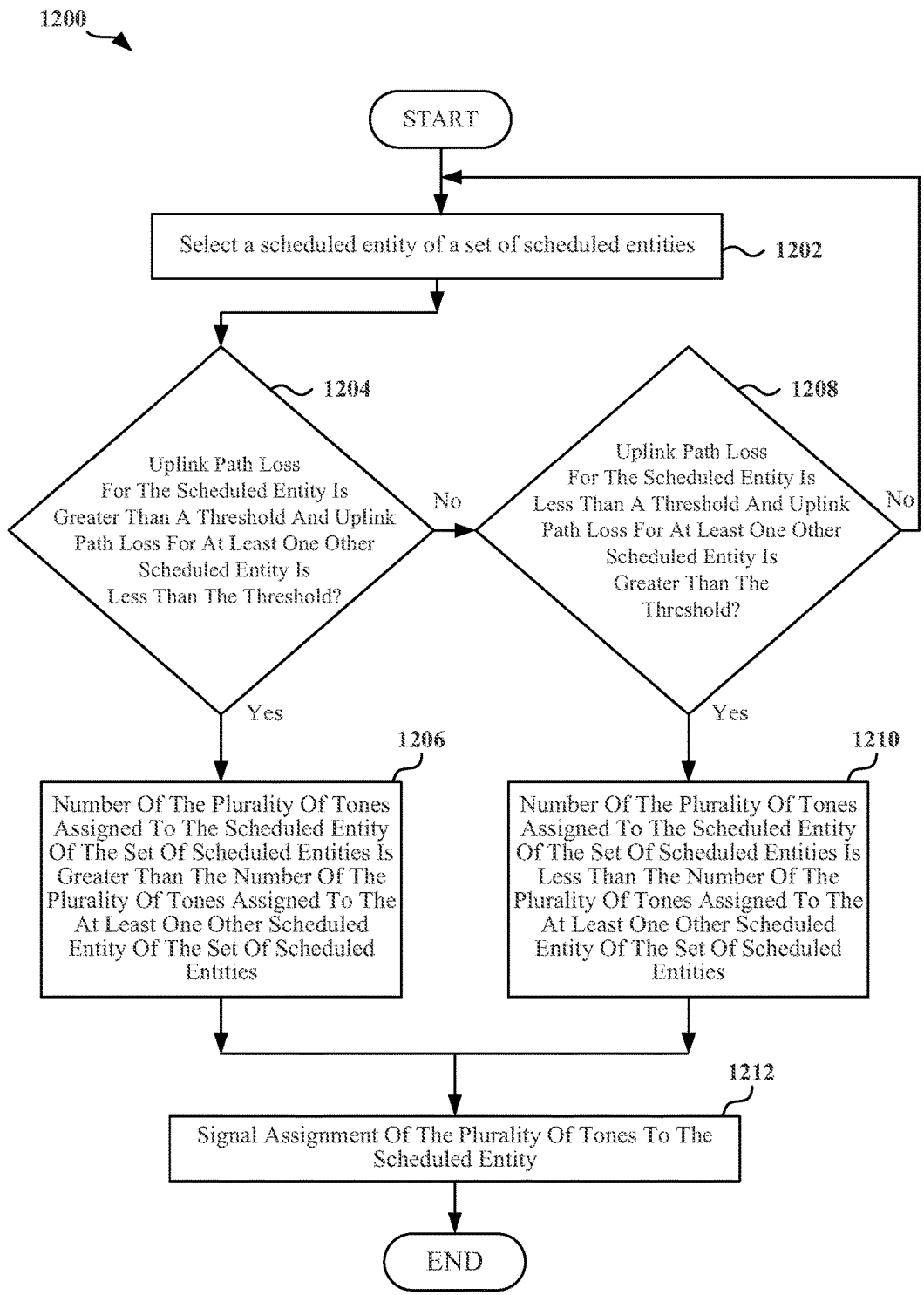
FIG. 12 is a flow chart illustrating an exemplary process for assigning tones to scheduled entities based on measured uplink path loss according to some aspects of the present disclosure.

FIG. 12 is a flow chart illustrating an exemplary process 1200 for assigning tones to scheduled entities based on measured uplink path loss according to some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 500 illustrated in FIG. 5. In some examples, the process 1200 may be carried out by any suitable apparatus or means for carrying out the functions or algorithm described below.

The process may be implemented, for example, at block 1106 of FIG. 11. According to one aspect, at block 1202 a scheduled entity of a set of scheduled entities may be selected. At block 1204 it is determined if the uplink path loss for the scheduled entity is greater than a threshold and the uplink path loss for at least one other scheduled entity is less than the threshold. If the determination is in the affirmative, then at block 1206 the number of the plurality of tones assigned to the scheduled entity of the set of scheduled entities is greater than the number of the plurality of tones assigned to the at least one other scheduled entity of the set of scheduled entities. At block 1212, the scheduling entity may signal the assignment of the plurality of tones to the scheduled entity. If the determination is not in the affirmative, then at block 1208 it is determined if the uplink path loss for the scheduled entity is less than a threshold and the uplink path loss for the at least one other scheduled entity is greater than the threshold. If the determination is in the affirmative, then at block 1210, the number of the plurality of tones assigned to the scheduled entity of the set of scheduled entities is less than the number of the plurality of tones assigned to the at least one other scheduled entity of the set of scheduled entities. At block 1212, the scheduling entity may signal the assignment of the plurality of tones to the scheduled entity. If the determination not in the affirmative, then the process may return to block 1202 where the next scheduled entity may be selected. For example, the resource assignment and scheduling circuitry 541 shown and described above in reference to FIG. 5 may perform all aspects of assigning tones to scheduled entities according to process 1200.

According to one example, the process 1100 for channel estimation in a wireless communication network may further include measuring a reference signal received power of an uplink reference signal received from the scheduled entity of the set of scheduled entities and subtracting the reference signal received power from a known uplink transmit power of the scheduled entity to determine the uplink path loss. According to one aspect, measuring the reference signal received power further includes receiving a sounding reference signal and measuring the reference signal received power of the sounding reference signal. According to one aspect, receiving the sounding reference signal further includes receiving the sounding reference signal transmitted with an increased uplink transmit power calculated using an increased downlink path loss relative to a measured downlink path loss. In one example, the process 900 for channel estimation in a wireless communication network may further include estimating one or more parameters of an uplink channel between a scheduling entity and the scheduled entity using the sounding reference signal. In another example, the process 900 for channel estimation in a wireless communication network may further include estimating one or more parameters of a downlink channel between a scheduling entity and the scheduled entity using the sounding reference signal.

Figure 13:
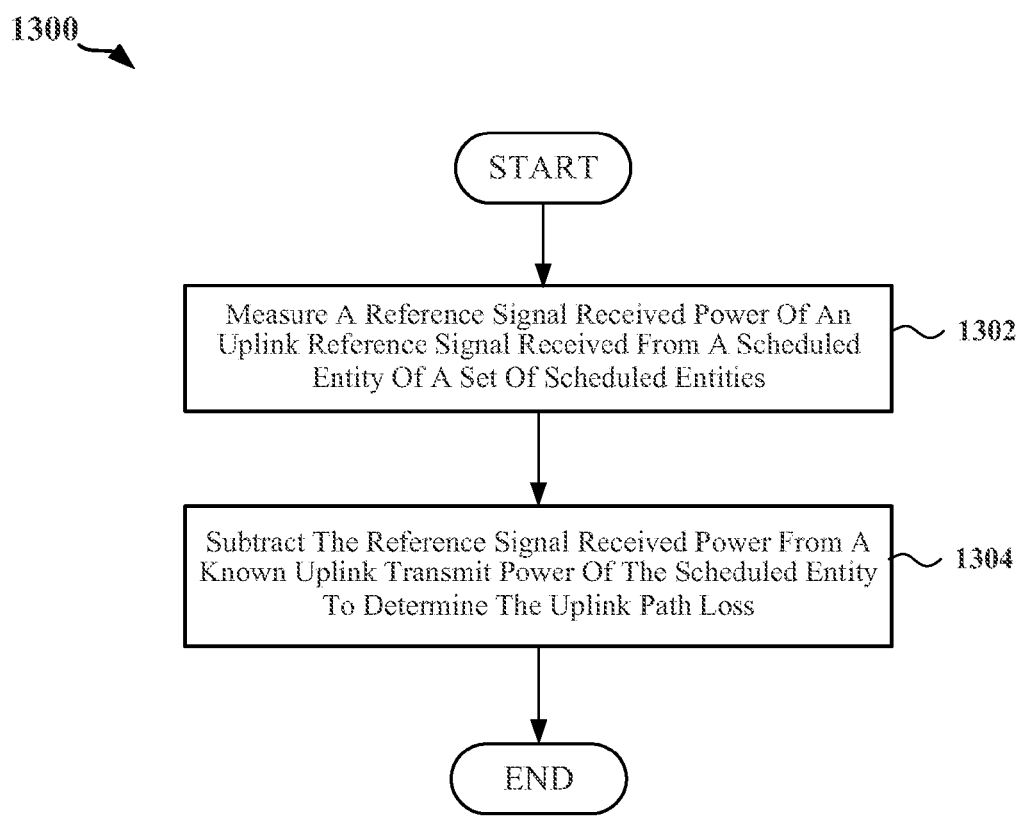
FIG. 13 is a flow chart illustrating an exemplary process for measuring uplink path loss according to some aspects of the present disclosure.

FIG. 13 is a flow chart illustrating an exemplary process 1300 for measuring uplink path loss according to some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 500 illustrated in FIG. 5. In some examples, the process 1300 may be carried out by any suitable apparatus or means for carrying out the functions or algorithm described below.

The process may be implemented, for example, at block 1102 of FIG. 11. According to one aspect, at block 1302, a process of measuring uplink path loss may include measuring a reference signal received power of an uplink reference signal received from the scheduled entity of the set of scheduled entities. At block 1304, the process of measuring uplink path loss may further include subtracting the reference signal received power from a known uplink transmit power of the scheduled entity to determine the uplink path loss. For example, the path loss measurement circuitry 545 shown and described above in reference to FIG. 5 may measure the uplink path loss in accordance with the present process 1300.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method to enable uplink channel estimation, between a scheduling entity and a first scheduled entity, in a wireless communication network, the method operational at the first scheduled entity, comprising:
measuring a downlink path loss ($DPL_M$);
multiplying $DPL_M$ by a factor (F), wherein:
$DPL_M*F>DPL_M$, and
F>1, which results from solving $DPL_M*F>DPL_M$ for F;
calculating an uplink transmit power using $DPL_M*F$; and
transmitting an uplink reference signal with the uplink transmit power to the scheduling entity to enable the uplink channel estimation.

2. The method of claim 1, wherein measuring the downlink path loss comprises:
receiving a downlink demodulation reference signal;
measuring a received power of the downlink demodulation reference signal; and
subtracting the received power from a known downlink transmit power to produce the measured downlink path loss ($DPL_M$).

3. The method of claim 1, wherein further comprising:
F>1 and F is based on resource utilization information indicating an amount of resources in use in the wireless communication network.

4. The method of claim 1, wherein calculating the uplink transmit power further comprises:
calculating the uplink transmit power for a Sounding Reference Signal (SRS).

5. The method of claim 1, wherein transmitting the uplink reference signal with the uplink transmit power further comprises:
transmitting a Sounding Reference Signal (SRS) with the uplink transmit power.

6. The method of claim 1, wherein measuring the downlink path loss comprises:
measuring a downlink path loss of a downlink reference signal.

7. The method of claim 1, wherein measuring the downlink path loss comprises:
receiving a channel state information reference signal;
measuring a received power of the channel state information reference signal; and
subtracting the received power from a known downlink transmit power to produce the measured downlink path loss ($DPL_M$).

8. The method of claim 6, wherein:
the downlink reference signal comprises a plurality of tones;
each of the plurality of tones is assigned to a respective scheduled entity of a set of scheduled entities, wherein the set of scheduled entities includes the first scheduled entity;
each scheduled entity of the set of scheduled entities is assigned a respective number of the plurality of tones; and
the number of tones assigned to at least one scheduled entity of the set of scheduled entities is different than the number of tones assigned to other scheduled entities of the set of scheduled entities.

9. The method of claim 8, further comprising:
estimating one or more parameters of a downlink channel between the scheduling entity and the first scheduled entity using the number of tones in the downlink reference signal assigned to the first scheduled entity.

10. The method of claim 9, wherein estimating the one or more parameters of the downlink channel further comprises:
calculating channel state information for the downlink channel using the number of tones in the downlink reference signal assigned to the first scheduled entity; and
transmitting the channel state information to the scheduling entity.

11. The method of claim 9, wherein the number of tones assigned to the first scheduled entity is greater than the number of tones assigned to at least one other scheduled entity of the set of scheduled entities.

12. An apparatus, of a first scheduled entity, for wireless communication between a scheduling entity and the first scheduled entity, comprising:
a processor;
a transceiver communicatively coupled to the processor; and
a memory communicatively coupled to the processor,
wherein the processor is configured to:
measure a downlink path loss ($DPL_M$);
multiply $DPL_M$ by a factor (F), wherein:
$DPL_M*F>DPL_M$ when $DPL_M$ is greater than a threshold, and
F>1, which results from solving $DPL_M*F>DPL_M$ for F;
calculate an uplink transmit power using $DPL_M*F$; and
transmit an uplink reference signal with the uplink transmit power to the scheduling entity to enable uplink channel estimation.

13. The apparatus of claim 12, wherein to measure the downlink path loss, the processor is further configured to:
receive a downlink demodulation reference signal;
measure a received power of the downlink demodulation reference signal; and
subtract the received power from a known downlink transmit power to produce the measured downlink path loss ($DPL_M$).

14. The apparatus of claim 12, wherein to measure the downlink path loss, the processor is further configured to:
measure a downlink path loss of a downlink reference signal.

15. The apparatus of claim 12, wherein to measure the downlink path loss, the processor is further configured to:
receive a channel state information reference signal;
measure a received power of the channel state information reference signal; and
subtract the received power from a known downlink transmit power to produce the measured downlink path loss ($DPL_M$).

16. The apparatus of claim 14, wherein:
the downlink reference signal comprises a plurality of tones;
each of the plurality of tones is assigned to a respective scheduled entity of a set of scheduled entities, wherein the set of scheduled entities includes the first scheduled entity;
each scheduled entity of the set of scheduled entities is assigned a respective number of the plurality of tones; and
the number of tones assigned to at least one scheduled entity of the set of scheduled entities is different than the number of tones assigned to other scheduled entities of the set of scheduled entities.

17. A method to enable downlink channel estimation in a wireless communication network, the method comprising:
measuring an uplink path loss for a scheduled entity of a set of scheduled entities;
generating a downlink reference signal including a plurality of tones;
assigning each of the plurality of tones to a respective scheduled entity of the set of scheduled entities, wherein a number of the plurality of tones assigned to the scheduled entity of the set of scheduled entities is different than the number of the plurality of tones assigned to at least one other scheduled entity of the set of scheduled entities based on the uplink path loss; and
transmitting the downlink reference signal including the plurality of tones to the set of scheduled entities to enable downlink channel estimations at each of the scheduled entities of the set of scheduled entities.

18. The method of claim 17, wherein the number of the plurality of tones assigned to the scheduled entity of the set of scheduled entities is less than the number of the plurality of tones assigned to the at least one other scheduled entity of the set of scheduled entities when the uplink path loss for the scheduled entity is less than a threshold and the uplink path loss for the at least one other scheduled entity is greater than the threshold, the method further comprising:
signaling an assignment of the plurality of tones to the scheduled entity.

19. The method of claim 17, wherein the number of the plurality of tones assigned to the scheduled entity of the set of scheduled entities is greater than the number of the plurality of tones assigned to the at least one other scheduled entity of the set of scheduled entities when the uplink path loss for the scheduled entity is greater than a threshold and the uplink path loss for the at least one other scheduled entity is less than the threshold, the method further comprising:
signaling an assignment of the plurality of tones to the scheduled entity.

20. The method of claim 17, wherein measuring the uplink path loss further comprises:
measuring a reference signal received power of an uplink reference signal received from the scheduled entity of the set of scheduled entities; and
subtracting the reference signal received power from a known uplink transmit power of the scheduled entity to determine the uplink path loss.

21. The method of claim 20, wherein measuring the reference signal received power further comprises:
receiving a sounding reference signal; and
measuring the reference signal received power of the sounding reference signal.

22. The method of claim 21, wherein receiving the sounding reference signal further comprises:
receiving the sounding reference signal transmitted with an increased uplink transmit power calculated using an increased downlink path loss relative to a measured downlink path loss.

23. The method of claim 22, further comprising:
estimating one or more parameters of a downlink channel between a scheduling entity and the scheduled entity using the sounding reference signal.

24. The method of claim 22, further comprising:
estimating one or more parameters of an uplink channel between a scheduling entity and the scheduled entity using the sounding reference signal.

25. An apparatus for wireless communication, comprising:
a processor;
a transceiver communicatively coupled to the processor; and
a memory communicatively coupled to the processor, wherein the processor is configured to:
measure an uplink path loss for a scheduled entity of a set of scheduled entities;
generate a downlink reference signal including a plurality of tones;
assign each of the plurality of tones to a respective scheduled entity of the set of scheduled entities, wherein a number of the plurality of tones assigned to the scheduled entity of the set of scheduled entities is different than the number of the plurality of tones assigned to at least one other scheduled entity of the set of scheduled entities based on the uplink path loss; and
transmit the downlink reference signal including the plurality of tones to the set of scheduled entities to enable downlink channel estimations at each of the scheduled entities of the set of scheduled entities.

26. The apparatus of claim 25, wherein to measure the uplink path loss, the processor is further configured to:
measure a reference signal received power of an uplink reference signal received from the scheduled entity of the set of scheduled entities; and
subtract the reference signal received power from a known uplink transmit power of the scheduled entity to determine the uplink path loss.

27. The apparatus of claim 26, wherein to measure the reference signal received power, the processor is further configured to:
receive a sounding reference signal; and
measure the reference signal received power of the sounding reference signal.

28. The apparatus of claim 27, wherein to receive the sounding reference signal, the processor is further configured to:
receive the sounding reference signal transmitted with an increased uplink transmit power calculated using an increased downlink path loss relative to a measured downlink path loss.

* * * * *